United States Patent
Togino

[11] Patent Number: 6,104,537
[45] Date of Patent: Aug. 15, 2000

[54] IMAGE-FORMING OPTICAL SYSTEM HAVING A DECENTERED OPTICAL ELEMENT IN A FIRST LENS GROUP

[75] Inventor: Takayoshi Togino, Koganei, Japan

[73] Assignee: Olympus Optical Co., Ltd., Tokyo, Japan

[21] Appl. No.: 09/110,441

[22] Filed: Jul. 7, 1998

[30] Foreign Application Priority Data

Jan. 7, 1998 [JP] Japan .................................. 10-001627

[51] Int. Cl.⁷ .................................................. G02B 27/14
[52] U.S. Cl. ............................................. 359/629; 359/637
[58] Field of Search ...................... 359/630, 631, 359/633, 637, 638, 728, 729; 345/7, 8

[56] References Cited

U.S. PATENT DOCUMENTS

| | | | |
|---|---|---|---|
| 3,810,221 | 5/1974 | Plummer | 396/382 |
| 3,836,931 | 9/1974 | Plummer | 354/155 |
| 5,274,406 | 12/1993 | Tejima | 353/70 |
| 5,701,202 | 12/1997 | Takahashi | 356/631 |
| 5,706,136 | 1/1998 | Okuyama et al. | 359/630 |
| 5,726,807 | 3/1998 | Nakaoka et al. | 359/631 |
| 5,734,505 | 3/1998 | Togino et al. | 359/631 |
| 5,912,764 | 6/1999 | Togino | 359/367 |
| 5,936,773 | 8/1999 | Togino | 359/630 |
| 5,963,376 | 10/1999 | Togino | 359/676 |

FOREIGN PATENT DOCUMENTS 7-333551 12/1995 Japan.
8-234137 9/1996 Japan.

*Primary Examiner*—Georgia Epps
*Assistant Examiner*—Ricky Mack
*Attorney, Agent, or Firm*—Pillsbury Madison & Sutro LLP

[57] ABSTRACT

An image-forming optical system, e.g. a variable-magnification optical system, using a compact decentered optical system capable of providing a clear image of minimal distortion even at a wide field angle. The image-forming optical system includes a first lens unit G1 disposed on the object side and formed from a decentered optical system, and a second lens unit G2 disposed on the image side of the first lens unit G1 and having at least one lens. The decentered optical system has at least one rotationally asymmetric surface having no axis of rotational symmetry in nor out of the surface to correct rotationally asymmetric aberrations caused by decentration. In the case of a variable-magnification optical system, a magnification change is effected by changing at least one spacing between the lens units.

28 Claims, 16 Drawing Sheets

IMAGE-FORMING OPTICAL SYSTEM HAVING A DECENTERED OPTICAL ELEMENT IN A FIRST LENS GROUP

BACKGROUND OF THE INVENTION

1. Field of the Invention

The present invention relates to an image-forming optical system and, more particularly, to an image-forming optical system using a decentered optical system having a power, which comprises a decentered reflecting surface.

2. Discussion of Related Art

There has heretofore been known a compact reflecting decentered optical system as disclosed in Japanese Patent Application Unexamined Publication Number [hereinafter referred to as "JP(A)"] 59-84201. This is an invention of a one-dimensional light-receiving lens comprising a cylindrical reflecting surface; therefore, two-dimensional imaging cannot be effected with the conventional optical system. JP(A) 62-144127 discloses an optical system wherein the identical cylindrical surface is used twice to effect reflection in order to reduce spherical aberration in the above-mentioned invention. JP(A) 62-205547 discloses the use of an aspherical reflecting surface as a reflecting surface, but makes no mention of the configuration of the reflecting surface.

U.S. Pat. Nos. 3,810,221 and 3,836,931 both disclose an example in which a rotationally symmetric aspherical mirror and a lens system having a surface which has only one plane of symmetry are used to constitute a finder optical system of a reflex camera. In this example, however, the surface having only one plane of symmetry is utilized for the purpose of correcting the tilt of a virtual image for observation.

JP(A) 1-257834 (U.S. Pat. No. 5,274,406) discloses an example in which a surface having only one plane of symmetry is used for a reflecting mirror to correct image distortion in a rear projection type television. In this example, however, a projection lens system is used for projection onto a screen, and the surface having only one plane of symmetry is used for correction of image distortion.

JP(A) 7-333551 discloses an example of a back-coated mirror type decentered optical system using an anamorphic surface and a toric surface as an observation optical system. However, the decentered optical system is not sufficiently corrected for aberrations, including image distortion.

None of the above-described prior art references a surface having only one plane of symmetry as a back-coated mirror to form a folded optical path.

Other examples of conventionally known optical systems include those disclosed in JP(A) 9-258105, 9-258106, 9-222561, 8-292372, 8-292368 and 8-248481. In these conventional optical systems, image formation takes place in the course of travel of light along the optical path. This causes the optical path to lengthen, making it impossible to construct a compact variable-magnification optical system.

Other examples are disclosed in JP(A) 9-222563, 9-211330, 9-211331 and 8-292371. However, these optical systems cannot change the magnification.

In the conventional rotationally symmetric optical systems, a transmitting rotationally symmetric lens having a refracting power is assigned to exert the required refracting power. Therefore, many constituent elements are needed for aberration correction. In the conventional decentered optical systems, an imaged figure or the like is undesirably distorted and the correct shape cannot be recorded unless the formed image is favorably corrected for aberrations, particularly rotationally asymmetric distortion.

In a rotationally symmetric optical system comprising a refracting lens which is formed from a surface rotationally symmetric about an optical axis, a straight-line optical path is formed. Therefore, the entire optical system undesirably lengthens in the direction of the optical axis, resulting in an unfavorably large structure.

SUMMARY OF THE INVENTION

In view of the problems associated with the prior art, an object of the present invention is to provide an image-forming optical system using a compact decentered optical system which is capable of providing a clear image of minimal distortion even at a wide field angle.

Another object of the present invention is to provide a variable-magnification optical system comprising at least two lens units including such a decentered optical system.

To attain the above-described objects, the present invention provides an image-forming optical system including a first lens unit disposed on the object side of the image-forming optical system. The first lens unit is formed from a decentered optical system. The image-forming optical system further includes a second lens unit disposed on the image side of the first lens unit. The second lens unit has at least one lens. The decentered optical system has at least one rotationally asymmetric surface having no axis of rotational symmetry in nor out of the surface to correct rotationally asymmetric aberrations caused by decentration.

In this case, the image-forming optical system may be arranged such that the first lens unit is disposed closest to the object in the image-forming optical system, and the second lens unit is adjacent to the first lens unit.

An aperture stop may be disposed between the first and second lens units.

The arrangement may be such that the first lens unit has a negative power as a whole, and the second lens unit has a positive power as a whole.

A third lens unit having at least one lens may be disposed on the image side of the second lens unit.

In this case, the third lens unit may have a positive power as a whole.

The image-forming optical system may be arranged such that zooming from a wide-angle end to a telephoto end is performed by changing the spacing between the first and second lens units.

In a case where the image-forming optical system has three lens units, it may be arranged such that zooming from the wide-angle end to the telephoto end is performed by changing both the spacing between the first and second lens units and the spacing between the second and third lens units.

In the above-described arrangements, the image-forming optical system may be arranged such that when zooming from the wide-angle end to the telephoto end is performed, at least the second lens unit is moved to change the spacing. In this case, the second lens unit may be moved toward the first lens unit.

A fourth lens unit may be additionally disposed on the image side of the third lens unit. In this case, the image-forming optical system may be arranged such that when zooming from the wide-angle end to the telephoto end is performed, the third lens unit is moved toward the fourth lens unit.

In addition, the present invention provides an image-forming optical system including two decentered optical systems each of which has at least one curved surface with a rotationally asymmetric surface configuration having no axis of rotational symmetry in nor out of the surface and in which rotationally asymmetric aberrations due to decentration are corrected by the rotationally asymmetric surface configuration. The image-forming optical system further includes at least two positive or negative lens units.

In addition, the present invention provides an image-forming forming optical system including two lens units each having a decentered optical system which has at least one curved surface with a rotationally asymmetric surface configuration having no axis of rotational symmetry in nor out of the surface and in which rotationally asymmetric aberrations due to decentration are corrected by the rotationally asymmetric surface configuration. The image-forming optical system further includes at least two other lens units. A magnification change is effected by changing at least one of the spacings between the four lens units.

It is desirable in the above-described image-forming optical systems that the rotationally asymmetric surface of at least one of the two decentered optical systems should use a plane-symmetry free-form surface having only one plane of symmetry.

First of all, a coordinate system used in the following description will be explained. It is assumed that a light ray passing through the center of an object point and passing through the center of a stop to reach the center of an image plane is defined as an axial principal ray. It is also assumed that an optical axis defined by a straight line along which the axial principal ray travels until it intersects the first surface of the optical system is defined as a Z-axis, and that an axis perpendicularly intersecting the Z-axis in the decentration plane of each decentered surface constituting the optical system is defined as a Y-axis, and further that an axis perpendicularly intersecting the optical axis and also perpendicularly intersecting the Y-axis is defined as an X-axis.

Ray tracing will be described by forward ray tracing in which light rays are traced from the object toward the image plane.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole. On the other hand, aspherical surfaces and the like are used to favorably effect aberration correction with a minimal number of surfaces. The reason for this is to reduce various aberrations which would be produced by spherical surfaces.

However, in a decentered optical system, rotationally asymmetric aberrations due to decentration cannot be corrected by a rotationally symmetric optical system.

The arrangement and operation of the present invention will be described below.

The basic arrangement of the present invention is as follows: An image-forming optical system includes a first lens unit having a decentered optical system disposed on the object side of the image-forming optical system, and a second lens unit disposed on the image side of the first lens unit and having at least one lens. The decentered optical system has at least one rotationally asymmetric surface having no axis of rotational symmetry in nor out of the surface to correct rotationally asymmetric aberrations caused by decentration.

When a rotationally symmetric optical system is decentered, rotationally asymmetric aberrations occur, and it is impossible to correct these aberrations only by a rotationally symmetric optical system. Rotationally asymmetric aberrations due to decentration include image distortion, curvature of field, and astigmatic and comatic aberrations, which occur even on the axis. FIG. 18 shows curvature of field produced by a decentered concave mirror M. FIG. 19 shows axial astigmatism produced by a decentered concave mirror M. FIG. 20 shows axial comatic aberration produced by a decentered concave mirror M. According to the present invention, a rotationally asymmetric surface is disposed in the optical system to correct such rotationally asymmetric aberrations due to decentration.

Rotationally asymmetric aberrations produced by the decentered concave mirror M include rotationally asymmetric curvature of field such as that shown in FIG. 18. For example, when light rays from an infinitely distant object point are incident on the decentered concave mirror M, the light rays are reflected by the concave mirror M to form an image. In this case, the back focal length from that portion of the concave mirror M on which the light rays strike to the image surface is half the curvature of the portion on which the light rays strike. Consequently, an image surface tilted with respect to the axial principal ray is formed as shown in FIG. 18. It has heretofore been impossible to correct such rotationally asymmetric curvature of field by a rotationally symmetric optical system. The tilted curvature of field can be corrected by forming the concave mirror M from a rotationally asymmetric surface, and, in this example, arranging it such that the curvature is made strong (refracting power is increased) in the positive Y-axis direction (the upward direction in the figure), whereas the curvature is made weak (refracting power is reduced) in the negative Y-axis direction. It is also possible to obtain a flat image surface with a minimal number of constituent surfaces by disposing a rotationally asymmetric surface having the same effect as that of the above-described arrangement in the optical system separately from the concave mirror M.

Next, rotationally asymmetric astigmatism will be explained. A decentered concave mirror M produces astigmatism even for axial rays, as shown in FIG. 19, as in the case of the above. The astigmatism can be corrected by appropriately changing the curvatures in the X- and Y-axis directions of the rotationally asymmetric surface as in the case of the above.

Rotationally asymmetric coma will be explained below. A decentered concave mirror M produces coma even for axial rays, as shown in FIG. 20, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

In the above-described basic arrangement of the present invention, if the decentered optical system is formed by using a folded optical path, it is possible to impart a power to the reflecting surface and hence possible to omit a transmission lens. Moreover, because the optical path is folded, the optical system can be formed in a compact structure.

By adding at least one lens unit comprising a positive or negative optical system to the decentered optical system, the principal point can be positioned in front of or behind the optical system, i.e. on the object or image side thereof. In other words, addition of at least one optical system makes it possible to construct an even more compact image-forming optical system.

The present invention includes an image-forming optical system which includes a first lens unit having a decentered optical system which has at least one curved surface with a rotationally asymmetric surface configuration having no axis of rotational symmetry in nor out of the surface and in which rotationally asymmetric aberrations due to decentration are corrected by the rotationally asymmetric surface configuration, and at least one other lens unit, wherein zooming from a wide-angle end to a telephoto end is performed by changing the spacing between the first and second lens units.

According to the present invention, a magnification change is effected by changing the spacing between the first lens unit having the decentered optical system and at least one other lens unit. With this arrangement, it becomes possible to construct a compact variable-magnification optical system.

It is preferable that at least one spacing between certain lens units should be varied by using a unit-spacing varying device that varies the spacing between the lens units by moving at least one lens unit in the direction of the axial principal ray. It is also possible to effect focusing by moving a part or all of the at least two lens units.

As the above-described rotationally asymmetric surface, it is desirable to use a plane-symmetry free-form surface having only one plane of symmetry.

Free-form surfaces used in the present invention may be defined by the following equation. It should be noted that the Z-axis of the defining equation is the axis of a free-form surface.

$$Z = cr^2 \sqrt{[1 + /\{1 - (1+k)c^2 r^2\}]} + \sum_{j=2}^{66} C_j X^m Y^n \quad \text{(a)}$$

In Eq. (a), the first term is a spherical surface term, and the second term is a free-form surface term.

In the spherical surface term:
c: the curvature at the vertex
k: a conic constant
$r = \sqrt{}(X^2 + Y^2)$ The free-form surface vertex is given by $$\sum_{j=2}^{66} C_j X^m Y^n =$$

$$C_2 X + C_3 Y + C_4 X^2 + C_5 XY + C_6 Y^2 + C_7 X^3 + C_8 X^2 Y + C_9 XY^2 +$$
$$C_{10} Y^3 + C_{11} X^4 + C_{12} X^3 Y + C_{13} X^2 Y^2 + C_{14} XY^3 + C_{15} Y^4 + C_{16} X^5 +$$
$$C_{17} X^4 Y + C_{18} X^3 Y^2 + C_{19} X^2 Y^3 + C_{20} XY^4 + C_{21} Y^5 + C_{22} X^6 +$$
$$C_{23} X^5 Y + C_{24} X^4 Y^2 + C_{25} X^3 Y^3 + C_{26} X^2 Y^4 + C_{27} XY^5 + C_{28} Y^6$$

where $C_j$ (j is an integer of 2 or higher) are coefficients.

Rotationally asymmetric aberrations due to decentration can be effectively corrected by using a free-form surface having either a plane of symmetry parallel to the YZ-plane or a plane of symmetry parallel to the XZ-plane.

It should be noted that the above defining equation is shown as merely an example, and that the feature of the present invention resides in that rotationally asymmetric aberrations due to decentration are corrected by a rotationally asymmetric surface having only one plane of symmetry. Therefore, the same advantageous effect can be obtained for any other defining equation.

It is desirable that the plane of symmetry of the rotationally asymmetric surface should be approximately coincident with the plane of decentration of each decentered surface constituting the decentered optical system.

If the rotationally asymmetric surface is a free-form surface which is disposed in the decentered optical system and which has a plane of symmetry approximately coincident with the decentration plane of each decentered surface, both sides of the plane of symmetry can be made symmetric. This makes it possible to favorably effect aberration correction and to improve the productivity to a considerable extent.

It is desirable for the decentered optical system to have a reflecting surface having a totally reflecting action or a reflecting action. If the reflecting surface is a totally reflecting surface tilted with respect to light rays so that the light rays are incident thereon at an angle exceeding the critical angle, a high reflectivity can be obtained. The reflecting surface is preferably a reflecting surface having a thin film of a metal, e.g. aluminum or silver, formed thereon, or a reflecting surface formed from a dielectric multilayer film. In the case of a metal thin film having reflecting action, a high reflectivity can be readily obtained. The use of a dielectric reflecting film is advantageous in a case where a reflecting film having wavelength selectivity or a semitransparent surface or a reflecting film having minimal absorption is to be formed.

It is also desirable to use the rotationally asymmetric surface having only one plane of symmetry as a reflecting surface. If such a free-form surface is formed as a reflecting surface, aberration correction can be made favorably. If a rotationally asymmetric surface is used as a reflecting surface, no chromatic aberration occurs in contrast to a case where it is used as a transmitting surface. Moreover, even if the tilt of the surface is small, the surface can bend light rays. Accordingly, the amount of other aberration produced by the surface is also small. In other words, when the same refracting power is to be obtained, the amount of aberration produced by a reflecting surface is smaller than by a refracting surface.

In this case, it is desirable to use the rotationally asymmetric surface having only one plane of symmetry as a back-coated mirror. By forming the above-described reflecting surface from a back-coated mirror, curvature of field can be reduced. The reason for this is as follows: When concave mirrors of the same focal length are to be formed from a back-coated mirror and a surface-coated mirror, respectively, the back-coated mirror can have a greater radius of curvature by an amount corresponding to the refractive index and thus produces a smaller amount of aberration, particularly curvature of field.

Assuming that in the above-described decentered optical system a light ray emanating from the center of an object point and passing through the center of a pupil to reach the center of an image is defined as an axial principal ray, it is desirable that the rotationally asymmetric surface should be tilted with respect to the axial principal ray. If the rotationally asymmetric surface is tilted with respect to the axial principal ray, it is possible to correct decentration aberrations even more effectively. In particular, when the reflecting surface has a power, it is possible to correct comatic aberration and astigmatism due to decentration produced by another surface.

The power of a rotationally asymmetric surface in the optical system according to the present invention will be described below. As shown in FIG. 21, when the direction of decentration of a first lens unit G1 of an optical system S is taken in the Y-axis direction, the axial principal ray in the optical system S and a light ray which is parallel to the axial principal ray and which has a height d in the YZ-plane are made to enter the optical system S from the object side thereof, and the tangent of an angle ω formed between the two rays as projected on the YZ-plane at the exit side of the optical system S is divided by the value d to determine the power Py in the Y-axis direction of the entire optical system. Similarly, the power Px in the X-axis direction of the entire optical system is defined. Further, the powers in the Y- and X-axis directions of the n-th lens unit of the optical system S according to the present invention are similarly defined as Pny and Pnx, respectively. When no distinction is made between the X- and Y-axis directions, the power is denoted by Pn.

In the present invention, assuming that Px/Py denotes the ratio of the power Px in the X-axis direction of the entire optical system to the power Py in the Y-axis direction of the entire optical system, it is desirable from the viewpoint of aberration correction to satisfy the following condition:

$$0.1 < Px/Py < 10 \quad (1\text{-}1)$$

If Px/Py is not larger than the lower limit of the condition (1-1), i.e. 0.1, or not smaller than the upper limit, i.e. 10, the focal lengths in the X- and Y-axis directions of the entire optical system become excessively different from each other, and it becomes difficult to favorably correct the image distortion. Consequently, the image is undesirably distorted.

It is more desirable from the viewpoint of aberration correction that Px/Py should satisfy the following condition:

$$0.5 < Px/Py < 2 \quad (1\text{-}2)$$

By satisfying the condition (1-2), rotationally asymmetric aberrations can be corrected even more favorably.

It is still more desirable from the viewpoint of aberration correction that Px/Py should satisfy the following condition:

$$0.8 < Px/Py < 1.2 \quad (1\text{-}3)$$

By satisfying the condition (1-3), rotationally asymmetric aberrations can be corrected even more favorably.

In a case where the optical system according to the present invention is constructed in the form of a variable-magnification optical system having four or more lens units, it is important that the ratio of the power P2 of the second lens unit to the power P3 of the third lens unit should satisfy the following condition:

$$0.01 < P2/P3 < 100 \quad (2\text{-}1)$$

The condition (2-1) defines the powers of the second and third lens units relative to each other. If P2/P3 is not larger than the lower limit, i.e. 0.01, the power of the second lens unit becomes excessively small. If P2/P3 is not smaller than the upper limit, i.e. 100, the power of the third lens unit becomes excessively large. In either case, the amount of movement of the second or third lens unit for zooming becomes excessively large, causing the optical system to become undesirably large and making it impossible to attain a high zoom ratio.

It is more desirable for P2/P3 to satisfy the following condition:

$$0.1 < P2/P3 < 10 \quad (2\text{-}2)$$

It is even more desirable for P2/P3 to satisfy the following condition:

$$0.5 < P2/P3 < 2 \quad (2\text{-}3)$$

Further, the relationship between the power of the first lens unit and the power of the entire optical system in the present invention is defined as follows: Assuming that the powers in the X- and Y-axis directions of the entire optical system at the wide zooming end are PWx and PWy, respectively, and the powers in the X- and Y-axis directions of the entire optical system at the telephoto zooming end are PTx and PTy, respectively, and that P1/P represents each of P1x/PWx,
P1y/PWy,
P1x/PTx,
P1y/PTy, it is important for P1/P to satisfy the following condition:

$$-100 < P1/P < -0.01 \quad (3\text{-}1)$$

The condition (3-1) is particularly important when a wide-field variable-magnification optical system is to be constructed. If P1/P is not larger than the lower limit, i.e. −100, aberrations produced by the first lens unit, particularly image distortion, become excessively large and hence impossible to correct by another lens unit. If P1/P is not smaller than the upper limit, i.e. −0.01, the power of the first lens unit becomes excessively weak, and it becomes difficult for the first lens unit to converge the divergence of light rays at the wide-angle end. Consequently, the lens diameter becomes unfavorably large, and it becomes impossible to construct the optical systems of the second and higher lens units.

It is more desirable to satisfy the following condition:

$$-10 < P1/P < -0.1 \quad (3\text{-}2)$$

It is even more desirable to satisfy the following condition:

$$-2 < P1/P < -0.2 \quad (3\text{-}3)$$

In a case where the optical system according to the present invention is constructed in the form of a variable-magnification optical system having four lens units, the relationship between the power P4 of the fourth lens unit and the power P of the entire optical system is defined as follow: Assuming that P4/P represents each of P4x/PWx,
P4y/PWy,
P4x/PTx,
P4y/PTy, it is important for P4/P to satisfy the following condition:

$$0.01 < P4/P < 100 \quad (4\text{-}1)$$

The condition (4-1) is necessary to satisfy in order to shorten the overall length of the variable-magnification optical system. If P4/P is not larger than the lower limit, i.e. 0.01, aberrations produced by the first lens unit, particularly curvature of field, become excessively large and hence impossible to correct by another lens unit. If P4/P is not smaller than the upper limit, i.e. 100, the power of the fourth lens unit becomes excessively weak, and the optical path length from the fourth lens unit to the image plane becomes excessively long. Thus, it becomes impossible to construct the optical system in a compact structure.

It is more desirable to satisfy the following condition:

$$0.1 < P4/P < 10 \quad (4\text{-}2)$$

It is even more desirable to satisfy the following condition:

$0.2 < P4/P < 2$ \hfill (4-3)

The decentered optical system may comprise only a first reflecting surface, wherein light rays are reflected by the first reflecting surface in a direction different from a direction in which the light rays are incident thereon when entering the optical system. If the first reflecting surface is tilted with respect to the axial principal ray, aberrations due to decentration are produced when light rays are reflected at the surface. Rotationally asymmetric aberrations due to decentration can be satisfactorily corrected by forming the reflecting surface from a rotationally asymmetric surface. If the reflecting surface is not formed from a rotationally asymmetric surface, rotationally asymmetric aberrations occur to a considerable extent, causing resolution to be degraded. Further, aberration correction can be made even more effectively by satisfying the above conditions (1-1) to (4-3).

The decentered optical system may comprise a first reflecting surface and a first transmitting surface, wherein light rays enter the optical system through the first transmitting surface and are reflected by the first reflecting surface to exit from the optical system through the first transmitting surface in a direction different from a direction in which the light rays are incident on the first transmitting surface when entering the decentered optical system. By adding one transmitting surface, the Petzval sum of the optical system can be reduced. In the case of transmitting and reflecting surfaces of positive power, Petzval curvatures cancel each other. Accordingly, power can be dispersed, and the Petzval sum can be reduced. Thus, it becomes possible to correct curvature of field. It is preferable from the viewpoint of favorably correcting field curvature that the first transmitting surface and the first reflecting surface should have powers of the same sign at their axial principal ray transmitting and reflecting regions.

The decentered optical system may comprise a first reflecting surface, a first transmitting surface, and a second transmitting surface, wherein light rays enter the optical system through the first transmitting surface and are reflected by the first reflecting surface to exit from the optical system through the second transmitting surface in a direction different from a direction in which the light rays are incident on the first transmitting surface when entering the decentered optical system. By dividing the above-described first transmitting surface into two surfaces, i.e. a surface through which light rays enter the optical system, and a surface through which light rays exit from the optical system, curvature of field can be corrected even more favorably. In a case where the first transmitting surface is a lens having a positive power with respect to transmitted light, it is possible to suppress divergence of light rays at the first reflecting surface and hence possible to reduce the size of the first reflecting surface. If the optical system is arranged such that light rays travel successively via the first transmitting surface, the first reflecting surface and the second transmitting surface, it is possible to form the first reflecting surface from a back-coated mirror. If the first reflecting surface is formed from a back-coated mirror, curvature of field can be corrected more favorably than in the case of a surface-coated mirror. If either or both of the first and second transmitting surfaces are given a power of the same sign as that of the first reflecting surface, curvature of field can be corrected approximately completely.

On the other hand, if the powers of the first and second transmitting surfaces are made approximately zero, favorable effects can be produced on chromatic aberrations. That is, the first reflecting surface produces no chromatic aberration in theory and hence need not correct chromatic aberration with another surface. Therefore, the powers of the first and second transmitting surfaces are made approximately zero so that no chromatic aberration is produced by these surfaces. This makes it possible to construct an optical system having minimal chromatic aberrations as a whole.

The decentered optical system may comprise a first reflecting surface, a second reflecting surface, and a first transmitting surface, wherein light rays enter the optical system through the first transmitting surface and are reflected by the first reflecting surface and then reflected by the second reflecting surface to exit from the optical system through the first transmitting surface. If the decentered optical system comprises a pair of first and second reflecting surfaces and a first transmitting surface, the optical axis can be folded by the two reflecting surfaces. This enables a reduction in the size of the optical system. Moreover, because reflection takes place an even number of times, an image can be formed without being reversed. Further, it is possible to vary the powers of the two reflecting surfaces. Accordingly, the principal point can be positioned in front of or behind the optical system by using a combination of a positive power and a negative power or a combination of a negative power and a positive power. This also makes it possible to produce favorable effects on the curvature of field. Furthermore, it is also possible to substantially eliminate field curvature by forming the two reflecting surfaces from back-coated mirrors.

The decentered optical system may comprise a first reflecting surface, a second reflecting surface, a first transmitting surface, and a second transmitting surface, wherein light rays enter the optical system through the first transmitting surface and are reflected by the first reflecting surface and then reflected by the second reflecting surface to exit from the optical system through the second transmitting surface. If the decentered optical system comprises a pair of first and second reflecting surfaces and a pair of first and second transmitting surfaces, the optical axis can be folded by the two reflecting surfaces, and thus the optical system can be constructed in a compact form. Moreover, the presence of two transmitting surfaces makes it possible to produce even more favorable effects on the principal point position and the curvature of field. Furthermore, even more favorable aberration correcting performance can be obtained by forming the two reflecting surfaces from back-coated mirrors.

In a case where the decentered optical system comprises a first reflecting surface, a second reflecting surface, a first transmitting surface, and a second transmitting surface as described above, the reflecting surfaces may be disposed such that the principal rays and reflected rays thereof substantially intersect each other in the decentered optical system. By virtue of this arrangement, the decentered optical system can be constructed in a compact form. The arrangement makes it possible to dispose the object and image planes approximately perpendicular to each other. Accordingly, the optical system and an image pickup device, which is disposed at the image-formation position, can be disposed approximately parallel to each other. Thus, an image pickup optical system of low height can be constructed.

In the above-described case, the reflecting surfaces may be disposed such that the principal rays and reflected rays thereof do not substantially intersect each other. If the optical system is arranged such that no portions of the axial principal optical path intersect each other, a Z-shaped optical path can be formed. Consequently, the angle of decentration at each reflecting surface can be reduced, and the amount of aberration due to decentration can be reduced. Therefore, the arrangement is favorable from the viewpoint of correcting aberrations due to decentration. Further, the optical path from the object to the optical system and the optical path from the optical system to the image plane can be disposed approximately parallel to each other. In particular, when the optical system is used as an observation optical system or an ocular optical system, the direction for observation of an object and the direction for observation through the optical system are identical with each other. Accordingly, it is possible to make observation without feeling incongruous.

In a case where the reflecting surfaces are disposed such that the principal rays and reflected rays thereof do not substantially intersect each other, the first transmitting surface and second reflecting surface of the decentered optical system may be the identical surface. If the first transmitting surface and the second reflecting surface are the identical surface, the number of surfaces to be formed is three. Accordingly, the productivity of the optical system improves.

In the above-described case, the first reflecting surface and second transmitting surface of the decentered optical system may be the identical surface. If the first reflecting surface and the second transmitting surface are the identical surface, the number of surfaces to be formed is three. Accordingly, the productivity of the optical system improves.

The decentered optical system may comprise a first reflecting surface, a second reflecting surface, a third reflecting surface, a first transmitting surface, and a second transmitting surface, wherein light rays enter the optical system through the first transmitting surface and are reflected successively by the first, second and third reflecting surfaces to exit from the optical system through the second transmitting surface in a direction different from a direction in which the light rays are incident on the first transmitting surface when entering the optical system. If the decentered optical system comprises three reflecting surfaces and two transmitting surfaces, the degree of freedom further increases, which is favorable from the viewpoint of aberration correction.

In this case, the first transmitting surface and second reflecting surface of the decentered optical system may be the identical surface. Alternatively, the first reflecting surface and third reflecting surface of the decentered optical system may be the identical surface. Alternatively, the second transmitting surface and second reflecting surface of the decentered optical system may be the identical surface. By forming at least two surfaces from the identical surface in this way, the productivity of the optical system improves.

Any of the above-described image-forming optical systems can be used as an image-forming optical system for a camera finder. If a rotationally asymmetric surface is used in an image-forming optical system of a camera finder optical system, favorable effects can be produced on chromatic aberrations as well as image distortion. It is preferable to use a rotationally asymmetric surface as a back-coated mirror. By doing so, aberrations can be minimized.

Any of the above-described image-forming optical systems can be used in a camera finder optical system. It is preferable to use rotationally asymmetric surfaces to form an image-forming optical system and ocular optical system of a camera finder optical system. By doing so, it is possible to provide a finder optical system which is compact and has minimal aberrations. It is preferable to use a rotationally asymmetric surface as a back-coated mirror and to construct a reflecting surface of an inversion prism as a back-coated mirror. By doing so, it is possible to provide a finder optical system having a reduced number of constituent elements.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 7 of the image-forming optical system according to the present invention in which the optical system is arranged as a zoom lens system will be described below.

Figure 1:
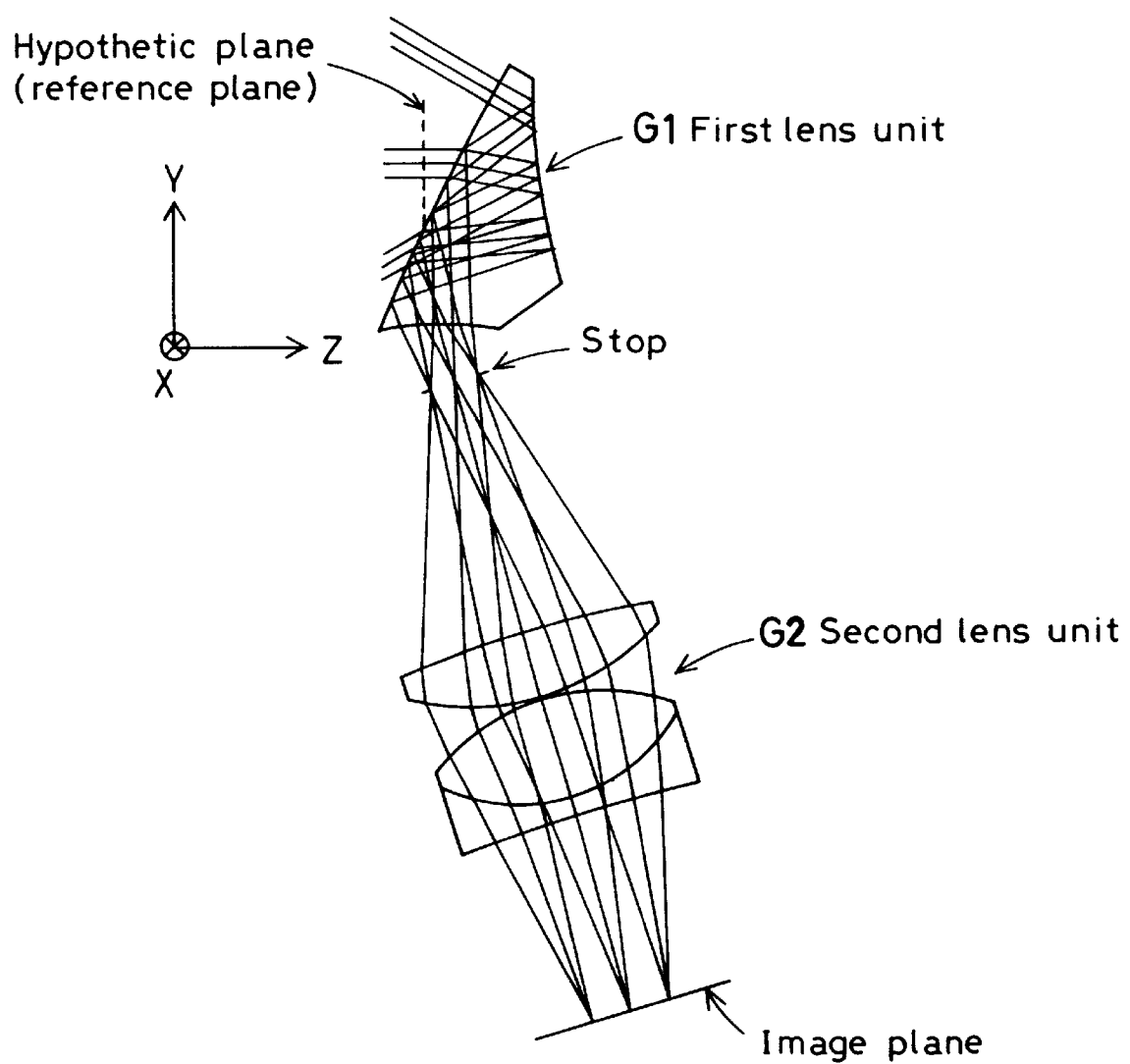
FIG. 1 is a sectional view of Example 1 in which an image-forming optical system according to the present invention is arranged as a zoom lens system, showing the zoom lens system at a wide-angle end thereof.

In constituent parameters of Examples 1 to 4, 6 and 7 (described later), coordinates of decentered surfaces are taken as follows: As shown in FIG. 1, the center of a reference plane is defined as the origin, and an optical axis is defined by a light ray emanating from the center of an object (not shown) and passing through the center of a stop to reach the center of an image. A direction in which the light ray travels along the optical axis until it reaches the first surface of a decentered optical system [first lens unit G1, fourth lens unit G4 (Examples 3 to 7)] is defined as a Z-axis direction. The direction of an axis perpendicularly intersecting the Z-axis through the origin in a plane in which the optical axis is folded by the decentered optical system is defined as a Y-axis direction. The direction of an axis perpendicularly intersecting both the Z- and Y-axes through the origin is defined as an X-axis direction. A direction in which the Z-axis extends from the object point to the first surface of the optical system is defined as a positive direction of the Z-axis. A direction in which the X-axis extends from the obverse side to the reverse side of the plane of the figure is defined as a positive direction of the X-axis. The X-, Y- and Z-axes constitute a right-handed orthogonal coordinate system. Regarding decentered surfaces, each surface is given displacements in the X-, Y- and Z-axis directions of the vertex position of the surface from the origin of the coordinate system and tilt angles of the center axis of the surface [the Z-axis of the above equation (a) in regard to free-form surfaces; the Z-axis of the following equation (b) in regard to rotationally symmetric aspherical surfaces] with respect to the X-, Y- and Z-axes [$\alpha$, $\beta$ and $\delta$ (°), respectively]. In this case, positive $\alpha$ and $\beta$ mean counterclockwise rotation relative to the positive directions of the corresponding axes, and positive $\gamma$ means clockwise rotation relative to the positive direction of the Z-axis. It should be noted that surface numbers (hereafter referred to as "surface Nos." are given according to the order in which light rays travel. Regarding a coaxial portion, the radius of curvature of each surface, surface separation between each surface and the subsequent surface, and the refractive index and Abbe's number at the back of each surface are given according to the conventional method.

Regarding Example 5 (described later), surface Nos. are given according to the order in which light rays travel. Parameters, exclusive of the tilt angle $\theta$ of each surface, are given according to the conventional notation for a coaxial system. Regarding each surface for which a tilt angle $\theta$ is shown, an amount of rotation of the center axis of an equation defining the surface from the optical axis incident on the surface is shown as a tilt angle $\theta$. It should be noted that, regarding the tilt angle, the counterclockwise direction is defined as a positive direction.

Free-form surfaces are polynomial surfaces expressed by the above equation (a). It should be noted that the Z-axis of the defining equation (a) is the axis of a free-form surface.

The configuration of a rotationally symmetric aspherical surface is defined by the following equation. The Z-axis of the defining equation is the axis of the rotationally symmetric aspherical surface.

$$Z=(r^2/R)/[1+\{1-(1+K)(r^2/R^2)\}^{1/2}]+A_4 r^4+A_6 r^6+A_{10} r^{10} \quad (b)$$

where $r=\sqrt{(X^2+Y^2)}$; R is the paraxial curvature radius (the radius of curvature at the vertex); K is a conic constant; and $A_4$, $A_6$, $A_8$, and $A_{10}$ are aspherical coefficients, respectively.

In the constituent parameters (described later), those coefficients concerning aspherical surfaces for which no data is shown are zero. The refractive index of a medium between surfaces is expressed by the refractive index for the spectral d-line (wavelength: 587.56 nanometers). Lengths are given in millimeters. Regarding the variable surface separation and power; W denotes a wide-angle end; S denotes a standard position; and T denotes a telephoto end. In addition, Px is the power in the X-axis direction of the entire optical system; Py is the power in the Y-axis direction of the entire optical system; Pn is the power of the n-th lens unit; Pnx is the power in the X-axis direction of the n-th lens unit; Pny is the power in the Y-axis direction of the n-th lens unit; PWx is the power in the X-axis direction of the entire optical system at the wide-angle end; and PWy is the power in the Y-axis direction of the entire optical system at the wide-angle end.

Free-form surfaces may also be defined by Zernike polynomials. That is, the configuration of a free-form surface may be defined by the following equation (c). The Z-axis of the defining equation (c) is the axis of Zernike polynomial.

$x = R \times \cos(A)$ $y = R \times \sin(A)$ $z = D_2$ $+ D_3 R \cos(A) + D_4 R \sin(A) + D_5 R^2 \cos(2A) + D_6 (R^2-1) + D_7 R^2 \sin(2A) + D_8$ $R^3 \cos(3A) + D_9(3R^3-2R)\cos(A) + D_{10}(3R^3-2R)\sin(A) + D_{11} R^3 \sin(3A) + D_{12}$ $R^4 \cos(4A) + D_{13}(4R^4-3R^2)\cos(2A) + D_{14}(6R^4-6R^2+1) + D_{15}(4R^4-3R^2)\sin(2A) + D_{16} R^4 \sin(4A) + D_{17}$ $R^5 \cos(5A) + D_{18}(5R^5-4R^3)\cos(3A) + D_{19}(10R^5-12R^3+3R)\cos(A) + D_{20}(10R^5-12R^3+3R)\sin(A) + D_{21}$ $(5R^5-4R^3)\sin(3A) + D_{22} R^5 \sin(5A) + D_{23} R^6 \cos(6A) + D_{24}(6R^6-5R^4)\cos(4A) + D_{25}$ $(15R^6-20R^4+6R^2)\cos(2A) + D_{26}(20R^6-30R^4+12R^2-1) + D_{27}$ $(15R^6-20R^4+6R^2)\sin(2A) + D_{28}(6R^6-5R^4)\sin(4A) + D_{29} R^6 \sin(6A) .(c)$ where $D_m$ (m is an integer of 2 or higher) are coefficients.

Examples of other surfaces usable in the present invention include those which are given by the following defining equation:

$$Z = \Sigma\Sigma C_{nm} XY$$

Assuming that k=7 (polynomial of degree 7), for example, the equation, when expanded, may be given by:

$$\begin{aligned}Z = {} & C_2 + C_3 y + C_4|x| + C_5 y^2 + C_6 y|x| + C_7 x^2 + C_8 y^3 + C_9 y^2|x| + \\ & C_{10} yx^2 + C_{11}|x^3| + C_{12} y^4 + C_{13} y^3|x| + C_{14} y^2 x^2 + C_{15} y|x^3| + \\ & C_{16} x^4 + C_{17} y^5 + C_{18} y^4|x| + C_{19} y^3 x^2 + C_{20} y^2|x^3| + \\ & C_{21} yx^4 + C_{22}|x^5| + C_{23} y^6 + C_{24} y^5|x| + C_{25} y^4 x^2 + C_{26} y^3|x^3| + \end{aligned} \quad (d)$$

-continued $$C_{27}y^2x^4 + C_{28}y|x^5| + C_{29}x^6 + C_{30}y^7 + C_{31}y^6|x| + C_{32}y^5x^2 +$$
$$C_{33}y^4|x^3| + C_{34}y^3x^4 + C_{35}y^2|x^5| + C_{36}yx^6 + C_{37}|x^7|$$

EXAMPLE 1

FIG. 1 is a sectional view of an optical system according to Example 1 taken by a YZ-plane containing the optical axis, showing the optical system at the wide-angle end. In this example, a zoom lens system has two lens units. A first lens unit G1 is formed from a rotationally asymmetric optical system (decentered optical system), and a second lens unit G2 is formed from a rotationally symmetric optical system. When zooming from the wide-angle end to the telephoto end is performed, the lens units are moved such that the spacing between the first and second lens units G1 and G2 decreases, while the spacing between the second lens unit G2 and the image plane increases.

The first lens unit G1 is a decentered optical system comprising three surfaces. The decentered optical system has a first surface which is a transmitting surface formed from a decentered rotationally symmetric aspherical surface; a second surface which is a reflecting surface formed from a decentered free-form surface; a third surface which is a reflecting surface formed from a decentered rotationally symmetric aspherical surface common to the first and third surfaces; and a fourth surface which is a transmitting surface formed from a decentered free-form surface. The second lens unit G2 includes a biconvex lens and a cemented lens comprising a biconvex lens and a biconcave lens. A stop is disposed between the first lens unit G1 and the second lens unit G2 so as to be integral with the first lens unit G1.

In this example, imaging field angles are as follows: The horizontal half field angle is from 35.8° to 13.9°, and the vertical half field angle is from 28.4° to 10.5°. The entrance pupil diameter is 1.2 millimeters. The image height is 2.45×1.84 millimeters. The focal length is equivalent to 24 millimeters to 50 millimeters in terms of the focal length of a 35-mm silver halide camera. The constituent parameters will be shown later. Displacements of each of the surface Nos. 2 to 5 are expressed by amounts of displacement from the surface No. 1 (hypothetic plane; reference plane). The positions of the vertices of the surface Nos. 7 to 12 (image plane) are expressed only by the surface separations from the surface No. 6 along the axial principal ray. The vertex of the surface No. 6 is expressed by the amount of displacement from the surface No. 1 (hypothetic plane; reference plane).

EXAMPLE 2

Figure 2:
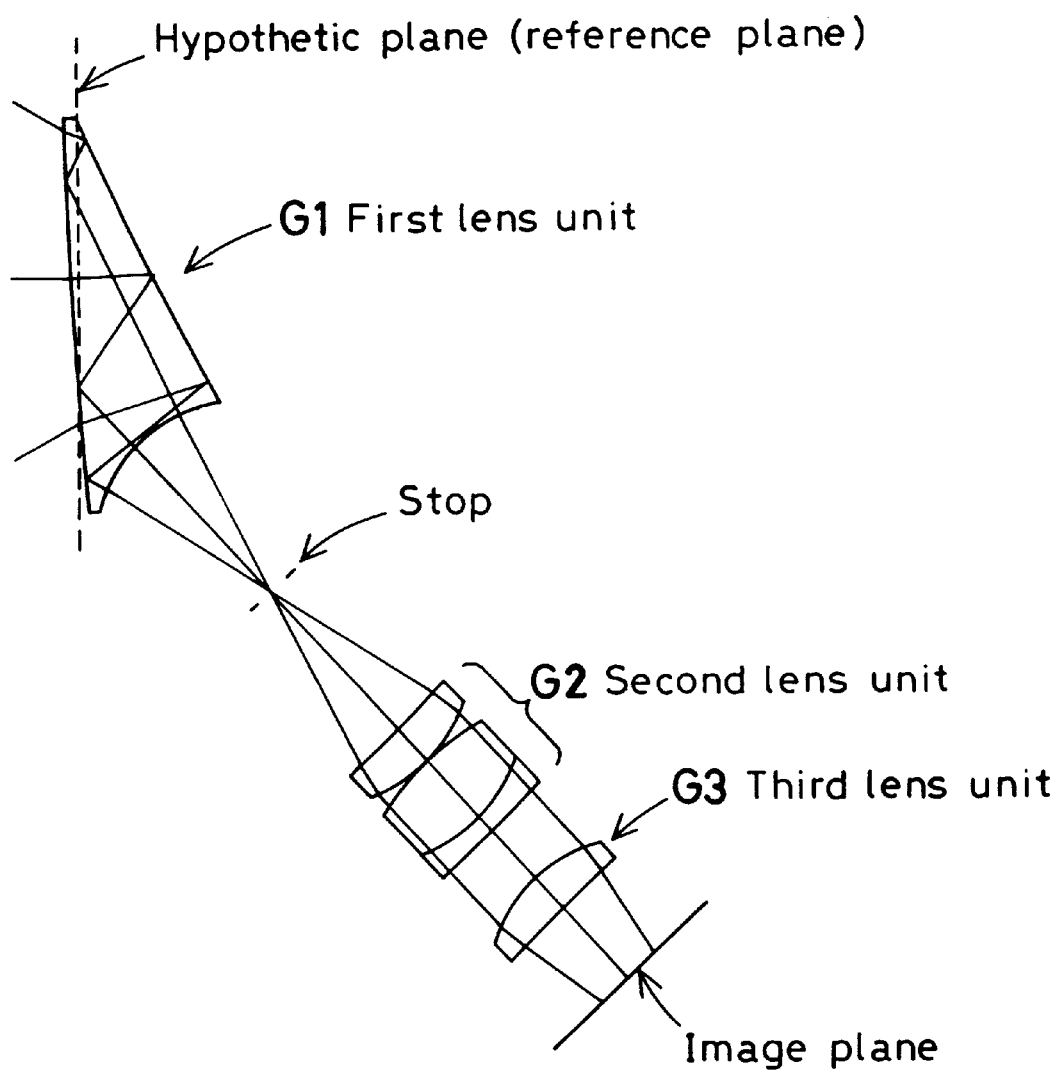
FIG. 2 is a sectional view showing a zoom lens system according to Example 2 at a wide-angle end thereof.

FIG. 2 is a sectional view of an optical system according to Example 2 taken by a YZ-plane containing the optical axis, showing the optical system at the wide-angle end. In this example, a zoom lens system has three lens units. A first lens unit G1 is formed from a rotationally asymmetric optical system (decentered optical system). A second lens unit G2 and a third lens unit G3 are each formed from a rotationally symmetric optical system. When zooming from the wide-angle end to the telephoto end is performed, the lens units are moved such that the spacing between the first and second lens units G1 and G2 decreases, while the spacing between the second and third lens units G2 and G3 increases, and the spacing between the third lens unit G3 and the image plane decreases. It should be noted that the spacing between the first lens unit G1 and the image plane is fixed.

The first lens unit G1 is a decentered optical system comprising three surfaces. The decentered optical system has a first surface which is a transmitting surface formed from a decentered rotationally symmetric aspherical surface; a second surface which is a reflecting surface formed from a decentered free-form surface; a third surface which is a reflecting surface formed from a decentered rotationally symmetric aspherical surface common to the first and third surfaces; and a fourth surface which is a transmitting surface formed from a decentered free-form surface. The second lens unit G2 includes a biconvex lens and a cemented lens comprising a biconvex lens and a negative meniscus lens having a convex surface directed toward the image side. The third lens unit G3 is formed from a positive meniscus lens having a convex surface directed toward the object side. A stop is disposed between the first lens unit G1 and the second lens unit G2 so as to be integral with the first lens unit G1.

In this example, imaging field angles are as follows: The horizontal half field angle is from 35.8° to 13.9°, and the vertical half field angle is from 28.40° to 10.50°. The entrance pupil diameter is 1.2 millimeters. The image height is 2.45×1.84 millimeters. The focal length is equivalent to 24 millimeters to 50 millimeters in terms of the focal length of a 35-mm silver halide camera. The constituent parameters will be shown later. Displacements of each of the surface Nos. 2 to 5 are expressed by amounts of displacement from the surface No. 1 (hypothetic plane; reference plane). The positions of the vertices of the surface Nos. 7 to 14 (image plane) are expressed only by the surface separations from the surface No. 6 along the axial principal ray. The vertex of the surface No. 6 is expressed by the amount of displacement from the surface No. 1 (hypothetic plane; reference plane).

EXAMPLE 3

Figure 3:
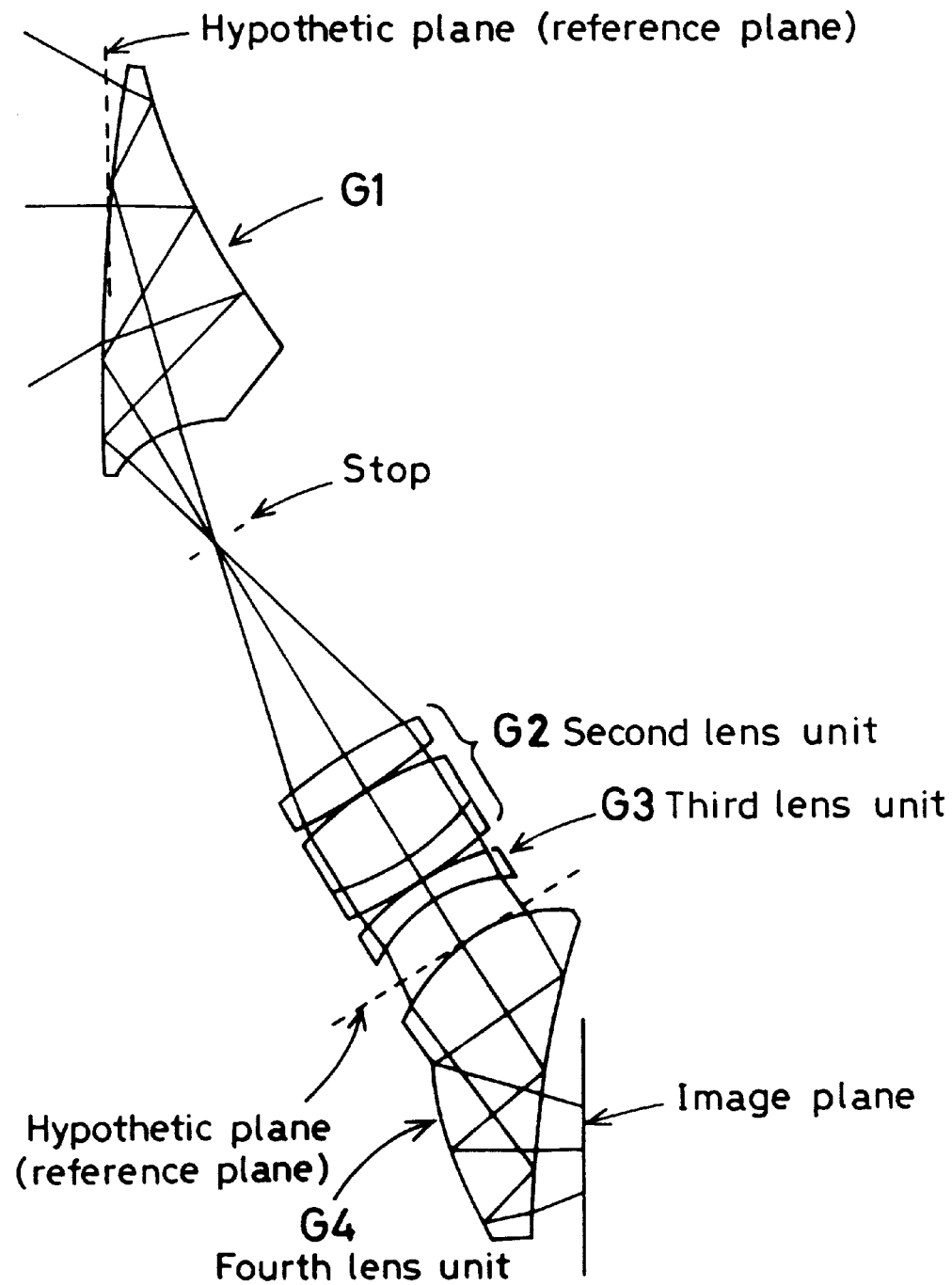
FIG. 3 is a sectional view showing a zoom lens system according to Example 3 at a wide-angle end thereof.

FIG. 3 is a sectional view of an optical system according to Example 3 taken by a YZ-plane containing the optical axis, showing the optical system at the wide-angle end. In this example, a zoom lens system has four lens units. A first lens unit G1 and a fourth lens unit G4 are each formed from a rotationally asymmetric optical system (decentered optical system). A second lens unit G2 and a third lens unit G3 are each formed from a rotationally symmetric optical system. When zooming from the wide-angle end to the telephoto end is performed, the lens units are moved such that the spacing between the first and second lens units G1 and G2 decreases, while the spacing between the second and third lens units G2 and G3 increases, and the spacing between the third lens unit G3 and the fourth lens unit G4 decreases. It should be noted that the spacing between the first lens unit G1 and the image plane is fixed.

The first lens unit G1 is a decentered optical system comprising three surfaces. The decentered optical system has a first surface which is a transmitting surface formed from a decentered rotationally symmetric aspherical surface; a second surface which is a reflecting surface formed from a decentered free-form surface; a third surface which is a reflecting surface formed from a decentered rotationally symmetric aspherical surface common to the first and third surfaces; and a fourth surface which is a transmitting surface formed from a decentered free-form surface. The second lens unit G2 includes a biconvex lens and a cemented lens comprising a biconvex lens and a negative meniscus lens having a convex surface directed toward the image side. The third lens unit G3 is formed from a negative meniscus lens having a convex surface directed toward the object side. The fourth lens unit G4 is a decentered optical system comprising three surfaces. The decentered optical system has a first surface which is a transmitting surface formed from a decentered free-form surface; a second surface which is a reflecting surface formed from a decentered rotationally symmetric aspherical surface; a third surface which is a reflecting surface formed from a decentered free-form surface; and a fourth surface which is a transmitting surface formed from a decentered rotationally symmetric aspherical surface common to the second and fourth surfaces. A stop is disposed between the first lens unit G1 and the second lens unit G2 so as to be integral with the first lens unit G1.

In this example, imaging field angles are as follows: The horizontal half field angle is from 35.8° to 13.9°, and the vertical half field angle is from 28.4° to 10.5°. The entrance pupil diameter is 1.2 millimeters. The image height is 2.45×1.84 millimeters. The focal length is equivalent to 24 millimeters to 50 millimeters in terms of the focal length of a 35-mm silver halide camera. The constituent parameters will be shown later. Displacements of each of the surface Nos. 2 to 5 are expressed by amounts of displacement from the surface No. 1 (hypothetic plane; reference plane). The positions of the vertices of the surface Nos. 7 to 14 (hypothetic plane) are expressed only by the surface separations from the surface No. 6 along the axial principal ray. The vertex of the surface No. 6 is expressed by the amount of displacement from the surface No. 1 (hypothetic plane; reference plane). Displacements of each of the surface Nos. 15 to 19 (image plane) are expressed by amounts of displacement from the surface No. 14 (hypothetic plane; reference plane).

EXAMPLE 4

Figure 4:
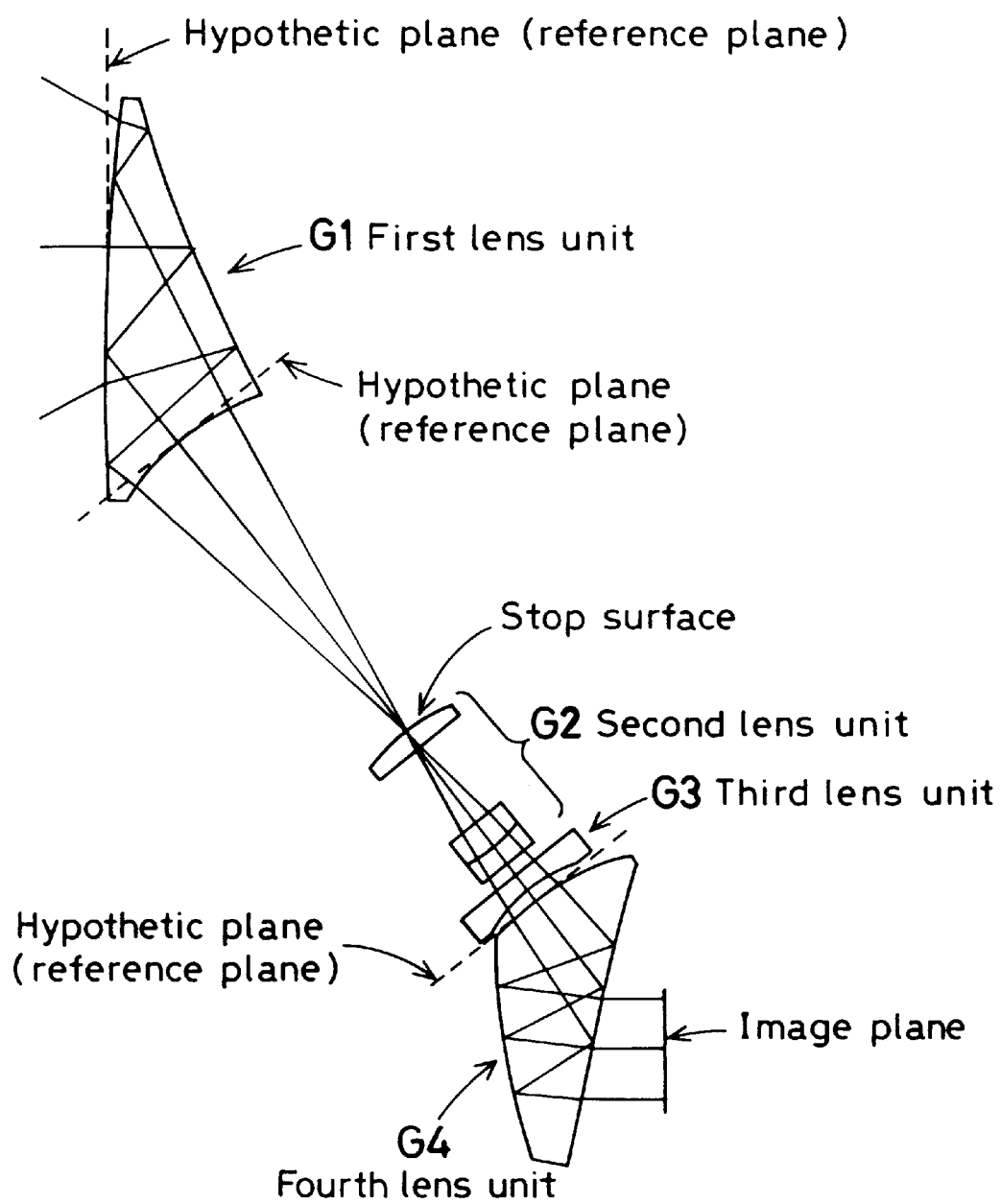
FIG. 4 is a sectional view showing a zoom lens system according to Example 4 at a wide-angle end thereof.

FIG. 4 is a sectional view of an optical system according to Example 4 taken by a YZ-plane containing the optical axis, showing the optical system at the wide-angle end. In this example, a zoom lens system has four lens units. A first lens unit G1 and a fourth lens unit G4 are each formed from a rotationally asymmetric optical system (decentered optical system). A second lens unit G2 and a third lens unit G3 are each formed from a rotationally symmetric optical system. When zooming from the wide-angle end to the telephoto end is performed, the lens units are moved such that the spacing between the first and second lens units G1 and G2 decreases, while the spacing between the second and third lens units G2 and G3 increases, and the spacing between the third and fourth lens units G3 and G4 increases. It should be noted that the spacing between the first lens unit G1 and the image plane is fixed.

The first lens unit G1 is a decentered optical system comprising three surfaces. The decentered optical system has a first surface which is a transmitting surface formed from a decentered rotationally symmetric aspherical surface; a second surface which is a reflecting surface formed from a decentered free-form surface; a third surface which is a reflecting surface formed from a decentered rotationally symmetric aspherical surface common to the first and third surfaces; and a fourth surface which is a transmitting surface formed from a decentered rotationally symmetric aspherical surface. The second lens unit G2 includes a positive meniscus lens having a convex surface directed toward the object side and a cemented lens comprising a biconvex lens and a negative meniscus lens having a convex surface directed toward the image side. The third lens unit G3 is formed from a biconcave lens. The fourth lens unit G4 is a decentered optical system comprising three surfaces. The decentered optical system has a first surface which is a transmitting surface formed from a decentered free-form surface; a second surface which is a reflecting surface formed from a decentered rotationally symmetric aspherical surface; a third surface which is a reflecting surface formed from a decentered free-form surface; and a fourth surface which is a transmitting surface formed from a decentered rotationally symmetric aspherical surface common to the second and fourth surfaces. A stop is disposed on the first surface of the second lens unit G2.

In this example, imaging field angles are as follows: The horizontal half field angle is from 35.8° to 13.9°, and the vertical half field angle is from 28.4° to 10.5°. The entrance pupil diameter is 1.2 millimeters. The image height is 2.45×1.84 millimeters. The focal length is equivalent to 24 millimeters to 50 millimeters in terms of the focal length of a 35-mm silver halide camera. The constituent parameters will be shown later. Displacements of each of the surface Nos. 2 to 5 are expressed by amounts of displacement from the surface No. 1 (hypothetic plane; reference plane). The positions of the vertices of the surface Nos. 7 to 14 (hypothetic plane) are expressed only by the surface separations from the surface No. 6 (hypothetic plane; reference plane) along the axial principal ray. The vertex of the surface No. 6 is expressed by the amount of displacement from the surface No. 1 (hypothetic plane; reference plane). Displacements of each of the surface Nos. 15 to 19 (image plane) are expressed by amounts of displacement from the surface No. 14 (hypothetic plane; reference plane).

EXAMPLE 5

Figure 5:
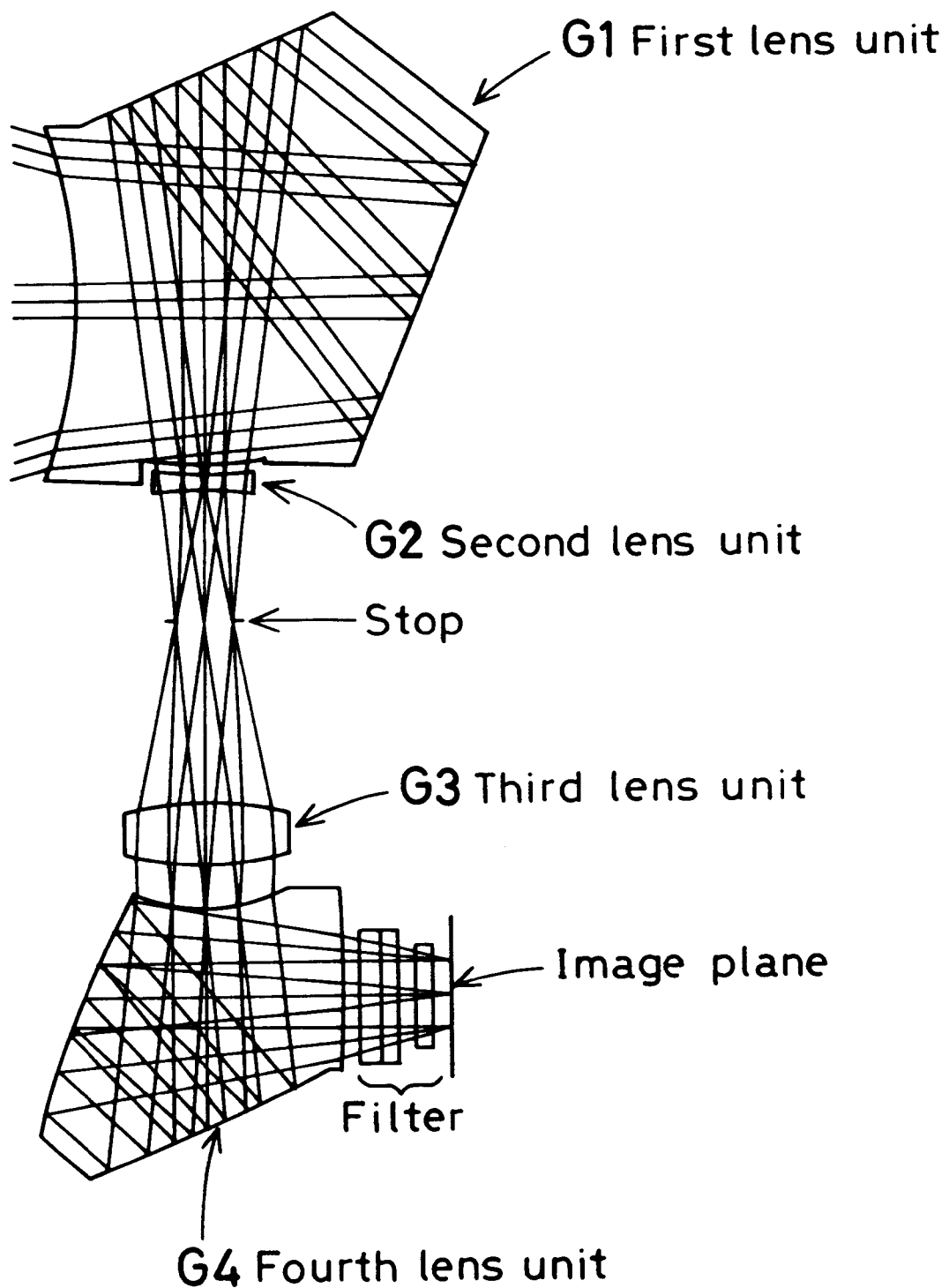
FIG. 5 is a sectional view showing a zoom lens system according to Example 5 at a wide-angle end thereof.

FIG. 5 is a sectional view of an optical system according to Example 5 taken by a YZ-plane containing the optical axis, showing the optical system at the wide-angle end. In this example, a zoom lens system has four lens units. A first lens unit G1 and a fourth lens unit G4 are each formed from a rotationally asymmetric optical system (decentered optical system). A second lens unit G2 and a third lens unit G3 are each formed from a rotationally symmetric optical system. A stop is fixed between the second lens unit G2 and the third lens unit G3. When zooming from the wide-angle end to the telephoto end is performed, the lens units are moved such that the spacing between the first and second lens units G1 and G2 increases, while the spacing between the second and third lens units G2 and G3 decreases, and the spacing between the third and fourth lens units G3 and G4 increases. It should be noted that the first lens unit G1, the fourth lens unit G4 and the image plane are fixed.

The first lens unit G1 is a decentered optical system comprising four surfaces. The decentered optical system has a first surface which is a transmitting surface formed from a free-form surface; a second surface which is a reflecting surface formed from a decentered free-form surface; a third surface which is a reflecting surface formed from a decentered free-form surface; and a fourth surface which is a transmitting surface formed from a free-form surface. The second lens unit G2 is formed from a biconcave lens. The third lens unit G3 is formed from a biconvex lens. The fourth lens unit G4 is a decentered optical system comprising four surfaces. The decentered optical system has a first surface which is a transmitting surface formed from a free-form surface; a second surface which is a reflecting surface formed from a decentered free-form surface; a third surface which is a reflecting surface formed from a decentered free-form surface; and a fourth surface which is a transmitting surface formed from a free-form surface. It should be noted that a filter unit is disposed between the fourth lens unit G4 and the image plane.

In this example, imaging field angles are as follows: The horizontal half field angle is from 21.0° to 7.3°, and the vertical half field angle is from 16.1° to 5.5°. The entrance pupil diameter is from 2.3 millimeters to 4.8 millimeters. The image height is 2.45×1.84 millimeters. The focal length is equivalent to 50 millimeters to 150 millimeters in terms of the focal length of a 35-mm silver halide camera. The constituent parameters will be shown later. The positions of the vertices of the surface Nos. 1 to 4 are defined by surface separations along the axial principal ray. Displacement of each of the surface Nos. 2 and 3 is given by only the tilt angle of the center axis of an equation defining the surface with respect to the axial principal ray. The positions of the vertices of the surface Nos. 10 to 13 are defined by surface separations along the axial principal ray. Displacement of each of the surface Nos. 11 and 12 is given by only the tilt angle of the center axis of an equation defining the surface with respect to the axial principal ray.

EXAMPLE 6

Figure 6:
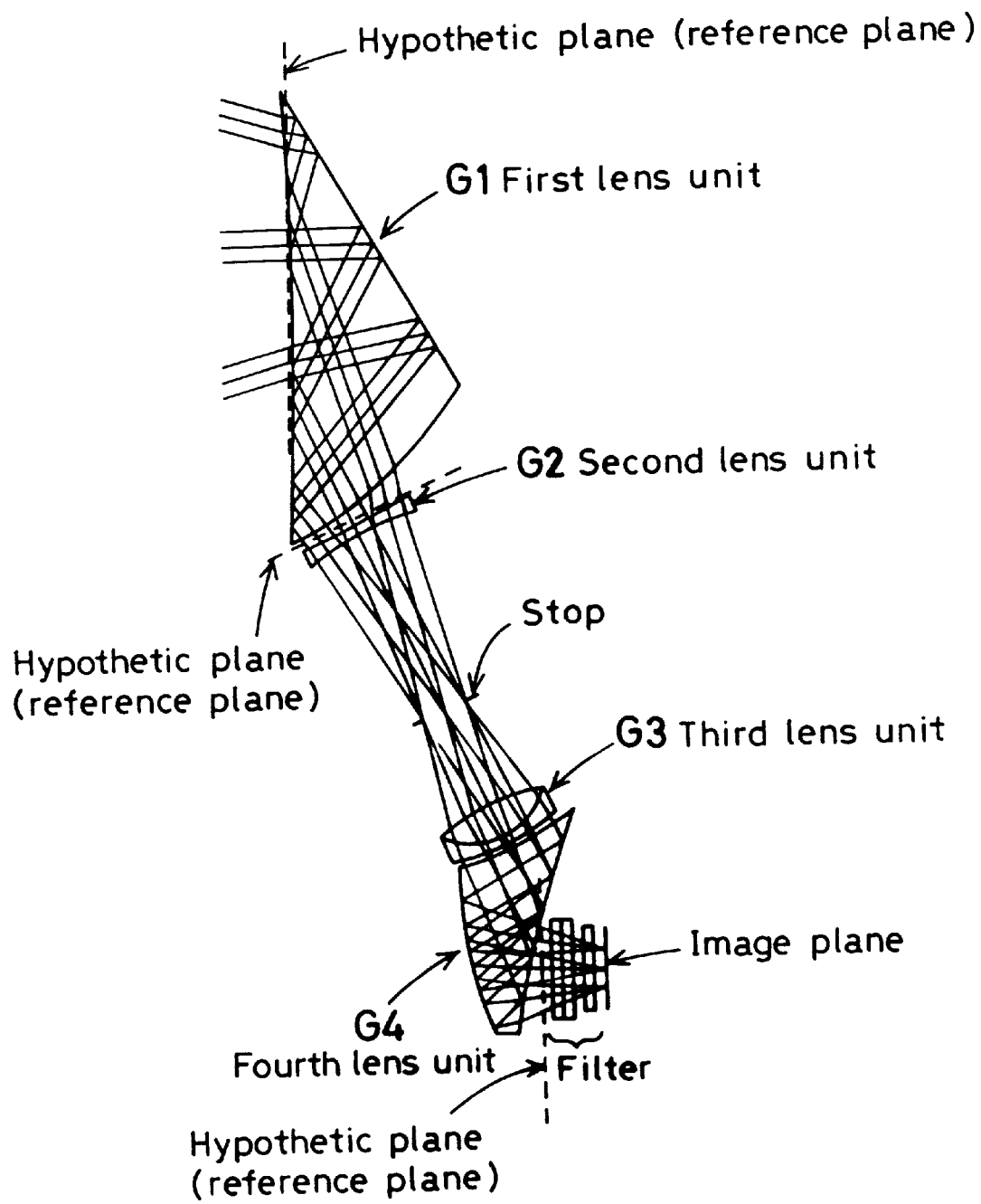
FIG. 6 is a sectional view showing a zoom lens system according to Example 6 at a wide-angle end thereof.

FIG. 6 is a sectional view of an optical system according to Example 6 taken by a YZ-plane containing the optical axis, showing the optical system at the wide-angle end. In this example, a zoom lens system has four lens units. A first lens unit G1 and a fourth lens unit G4 are each formed from a rotationally asymmetric optical system (decentered optical system). A second lens unit G2 and a third lens unit G3 are each formed from a rotationally symmetric optical system. A stop is fixed between the second lens unit G2 and the third lens unit G3. When zooming from the wide-angle end to the telephoto end is performed, the lens units are moved such that the spacing between the first and second lens units G1 and G2 increases, while the spacing between the second and third lens units G2 and G3 decreases, and the spacing between the third and fourth lens units G3 and G4 increases. It should be noted that the first lens unit G1, the fourth lens unit G4 and the image plane are fixed.

The first lens unit G1 is a decentered optical system comprising three surfaces. The decentered optical system has a first surface which is a transmitting surface formed from a decentered free-form surface; a second surface which is a reflecting surface formed from a decentered free-form surface; a third surface which is a reflecting surface formed from a decentered free-form surface common to the first and third surfaces; and a fourth surface which is a transmitting surface formed from a decentered free-form surface. The second lens unit G2 is formed from a biconcave lens. The third lens unit G3 is formed from a cemented lens comprising a biconvex lens and a negative meniscus lens having a convex surface directed toward the image side. The fourth lens unit G4 is a decentered optical system comprising three surfaces. The decentered optical system has a first surface which is a transmitting surface formed from a decentered free-form surface; a second surface which is a reflecting surface formed from a decentered free-form surface; a third surface which is a reflecting surface formed from a decentered free-form surface; and a fourth surface which is a transmitting surface formed from a decentered free-form surface common to the second and fourth surfaces. It should be noted that a filter unit is disposed between the fourth lens unit G4 and the image plane.

In this example, imaging field angles are as follows: The horizontal half field angle is from 21.0° to 7.3°, and the vertical half field angle is from 16.1° to 5.5°. The entrance pupil diameter is from 2.9 millimeters to 5.3 millimeters. The image height is 2.45×1.84 millimeters. The focal length is equivalent to 50 millimeters to 150 millimeters in terms of the focal length of a 35-mm silver halide camera. The constituent parameters will be shown later. Displacements of each of the surface Nos. 2 to 5 are expressed by amounts of displacement from the surface No. 1 (hypothetic plane; reference plane). The positions of the vertices of the surface Nos. 7 to 13 are expressed only by the surface separations from the surface No. 6 (hypothetic plane; reference plane) along the axial principal ray. The vertex of the surface No. 6 is expressed by the amount of displacement from the surface No. 1 (hypothetic plane; reference plane). Displacements of each of the surface Nos. 14 to 16 are expressed by amounts of displacement from the surface No. 13 [the center axis (the Z-axis of Eq. (a)) of this surface lies in the direction of the axial principal ray from the surface No. 7 to the surface No. 13]. The surface Nos. 18 and higher are expressed only by the surface separations along the axial principal ray from the surface No. 17 (hypothetic plane; reference plane) expressed by the amount of displacement from the surface No. 13.

EXAMPLE 7

Figure 7:
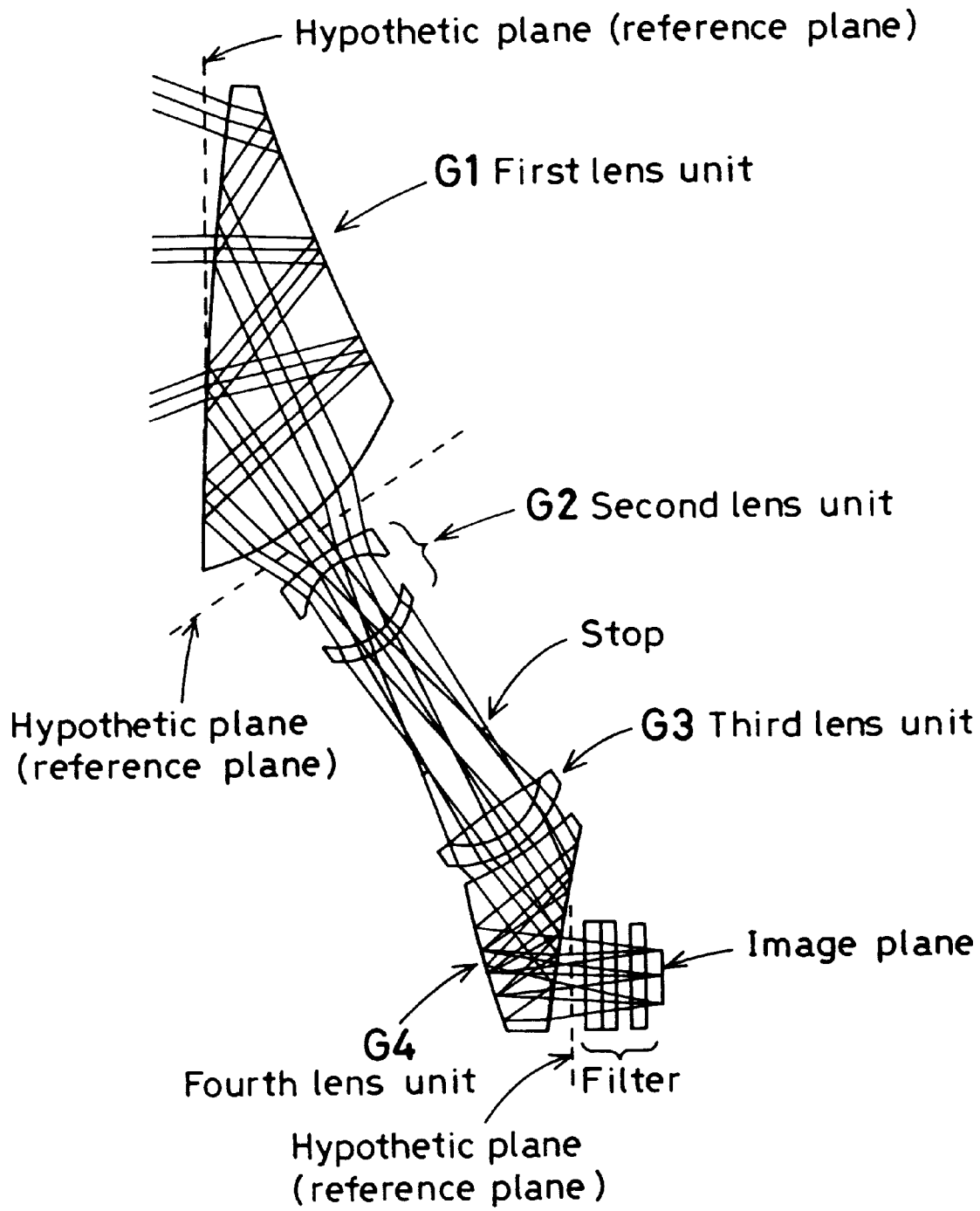
FIG. 7 is a sectional view showing a zoom lens system according to Example 7 at a wide-angle end thereof.

FIG. 7 is a sectional view of an optical system according to Example 7 taken by a YZ-plane containing the optical axis, showing the optical system at the wide-angle end. In this example, a zoom lens system has four lens units. A first lens unit G1 and a fourth lens unit G4 are each formed from a rotationally asymmetric optical system (decentered optical system). A second lens unit G2 and a third lens unit G3 are each formed from a rotationally symmetric optical system. A stop is fixed between the second lens unit G2 and the third lens unit G3. When zooming from the wide-angle end to the telephoto end is performed, the lens units are moved such that the spacing between the first and second lens units G1 and G2 increases, while the spacing between the second and third lens units G2 and G3 decreases, and the spacing between the third and fourth lens units G3 and G4 increases. It should be noted that the first lens unit G1, the fourth lens unit G4 and the image plane are fixed.

The first lens unit G1 is a decentered optical system comprising three surfaces. The decentered optical system has a first surface which is a transmitting surface formed from a decentered rotationally symmetric aspherical surface; a second surface which is a reflecting surface formed from a decentered free-form surface; a third surface which is a reflecting surface formed from a decentered rotationally symmetric aspherical surface common to the first and third surfaces; and a fourth surface which is a transmitting surface formed from a decentered free-form surface. The second lens unit G2 is formed from a negative meniscus lens having a convex surface directed toward the object side, and a negative meniscus lens having a convex surface directed toward the image side. The third lens unit G3 is formed from a cemented lens comprising a biconvex lens and a negative meniscus lens having a convex surface directed toward the image side. The fourth lens unit G4 is a decentered optical system comprising three surfaces. The decentered optical system has a first surface which is a transmitting surface formed from a decentered free-form surface; a second surface which is a reflecting surface formed from a decentered rotationally symmetric aspherical surface; a third surface which is a reflecting surface formed from a decentered free-form surface; and a fourth surface which is a transmitting surface formed from a decentered rotationally symmetric aspherical surface common to the second and fourth surfaces. It should be noted that a filter unit is disposed between the fourth lens unit G4 and the image plane.

In this example, imaging field angles are as follows: The horizontal half field angle is from 26.3° to 9.4°, and the vertical half field angle is from 20.3° to 7.1°. The entrance pupil diameter is from 1.9 millimeters to 3.7 millimeters. The image height is 2.45×1.84 millimeters. The focal length is equivalent to 35 millimeters to 105 millimeters in terms of the focal length of a 35-mm silver halide camera. The constituent parameters will be shown later. Displacements of each of the surface Nos. 2 to 5 are expressed by amounts of displacement from the surface No. 1 (hypothetic plane; reference plane). The positions of the vertices of the surface Nos. 7 to 14 are expressed only by the surface separations from the surface No. 6 (hypothetic plane; reference plane) along the axial principal ray. The vertex of the surface No. 6 is expressed by the amount of displacement from the surface No. 1 (hypothetic plane; reference plane). Displacements of each of the surface Nos. 16 to 18 are expressed by amounts of displacement from the surface No. 15 [the center axis (the Z-axis of Eq. (a)) of this surface lies in the direction of the axial principal ray from the surface No. 7 to the surface No. 14]. The surface Nos. 20 and higher are expressed only by the surface separations along the axial principal ray from the surface No. 19 (hypothetic plane; reference plane) expressed by the amount of displacement from the surface No. 15.

Constituent parameters in the foregoing Examples 1 to 7 are shown below. It should be noted that each free-form surface is denoted by "FFS", and each aspherical surface by "ASS".

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Hypothetic plane;Reference plane) | | | | |
| 2 | −2769.27 (ASS ①) | | (1) | 1.5163 | 64.1 |
| 3 | FFS ① (Reflective surface) | | (2) | 1.5163 | 64.1 |
| 4 | −2769.27 (ASS ①) (Reflective surface) | | (1) | 1.5163 | 64.1 |
| 5 | FFS ② | | (3) | | |
| 6 | ∞(Stop) | $d_6$ | (4) | | |
| 7 | 46.51 | 3.23 | | 1.6575 | 53.8 |
| 8 | −11.26 | 0.10 | | | |
| 9 | 9.69 | 4.67 | | 1.5549 | 64.2 |
| 10 | −8.83 | 1.00 | | 1.7550 | 27.6 |
| 11 | 79.94 | $d_{11}$ | | | |
| Image plane | ∞ | | | | |

ASS ①
K    0.0000
$A_4$  $4.4554 \times 10^{-5}$
FSS 1
c    0.0000
$C_4$   $1.4639 \times 10^{-2}$   $C_6$   $1.2299 \times 10^{-2}$   $C_8$   $6.2722 \times 10^{-4}$
$C_{10}$  $6.7146 \times 10^{-4}$   $C_{11}$  $-4.5261 \times 10^{-5}$   $C_{13}$  $-1.6407 \times 10^{-4}$
$C_{15}$  $4.5154 \times 10^{-5}$
FFS ②
c    0.0000
$C_4$   $2.5970 \times 10^{-2}$   $C_6$   $2.4134 \times 10^{-2}$   $C_8$   $-2.7086 \times 10^{-3}$
$C_{10}$  $-3.0262 \times 10^{-3}$  $C_{11}$  $1.9605 \times 10^{-4}$   $C_{13}$  $9.8904 \times 10^{-4}$
$C_{15}$  $8.2500 \times 10^{-4}$ Displacement and tilt(1)

X 0.00          Y −3.52         Z −1.70
α −25.74        β 0.00          γ 0.00

Displacement and tilt(2)

X 0.00          Y −0.64         Z 3.90
α 8.92          β 0.00          γ 0.00

Displacement and tilt(3)

X 0.00          Y −7.39         Z −0.92
α −89.55        β 0.00          γ 0.00

Displacement and tilt(4)

X 0.00          Y −10.14        Z −0.08
α −72.86        β 0.00          γ 0.00

Power of total system

|    | W | S | T |
|---|---|---|---|
| Px | 0.124050 | 0.056920 | 0.019450 |
| Py | 0.165390 | 0.076480 | 0.026180 |
| Fx | 8.061266 | 17.568517 | 51.413882 |
| Fy | 6.046315 | 13.075314 | 38.197097 |

Variable surface-separation

|   | W | T |
|---|---|---|

-continued

|  |  |  |
|---|---|---|
| $d_6$ | 11.89396 | 0.5 |
| $d_{11}$ | 9.20829 | 16.63704 |

Power of total system

|  |  |  |
|---|---|---|
| Px/Py | W | 1.0091 |
|  | T | 1.0061 |
| P1/PWx |  | −0.49686 |
| P1/PWy |  | −0.49624 |
| P1/PTx |  | −1.28138 |
| P1/PTy |  | −1.27567 |

EXAMPLE 2

| Surface No. | Radius of curvature | Surface separation | Displacement and tilt | Refractive index | Abbe's No. |
|---|---|---|---|---|---|
| Object plane | ∞ |  | ∞ |  |  |
| 1 | ∞ |  |  |  |  |
|  | (Hypothetic plane;Reference plane) |  |  |  |  |
| 2 | 457.30 (ASS ①) |  | (1) | 1.8830 | 40.7 |
| 3 | FFS ① |  | (2) | 1.8830 | 40.7 |
|  | (Reflective surface) |  |  |  |  |
| 4 | 457.30 (ASS ①) |  | (1) | 1.8830 | 40.7 |
|  | (Reflective surface) |  |  |  |  |
| 5 | FFS ② |  | (3) |  |  |
| 6 | ∞(Stop) | $d_6$ | (4) |  |  |
| 7 | 233.43 | 2.10 |  | 1.6200 | 60.3 |
| 8 | −10.01 | 0.10 |  |  |  |
| 9 | 15.82 | 3.82 |  | 1.4870 | 70.4 |
| 10 | −7.99 | 1.00 |  | 1.6200 | 50.0 |
| 11 | −49.99 | $d_{11}$ |  |  |  |
| 12 | 7.49 | 2.11 |  | 1.5163 | 64.1 |
| 13 | 41.62 | $d_{13}$ |  |  |  |
| Image plane | ∞ |  |  |  |  |

ASS ①
K  0.0000
$A_4$  $3.3636 \times 10^{-6}$

FFS ①
c  0.0000
$C_4$  $-1.8070 \times 10^{-3}$   $C_6$  $-1.1666 \times 10^{-3}$   $C_8$  $1.1431 \times 10^{-4}$
$C_{10}$  $6.4336 \times 10^{-5}$   $C_{11}$  $2.4771 \times 10^{-6}$   $C_{13}$  $5.5161 \times 10^{-6}$
$C_{15}$  $1.2749 \times 10^{-5}$ FFS ②
c  0.0000
$C_4$  $6.9325 \times 10^{-2}$   $C_6$  $7.2242 \times 10^{-2}$ Displacement and tilt(1)

| X 0.00 | Y −5.31 | Z 0.38 |
|---|---|---|
| α 4.46 | β 0.00 | γ 0.00 |

Displacement and tilt(2)

| X 0.00 | Y 0.13 | Z 4.24 |
|---|---|---|
| α 28.15 | β 0.00 | γ 0.00 |

Displacement and tilt(3)

| X 0.00 | Y −8.34 | Z 3.35 |
|---|---|---|
| α −44.97 | β 0.00 | γ 0.00 |

Displacement and tilt(4)

| X 0.00 | Y −15.49 | Z 10.19 |
|---|---|---|
| α −46.21 | β 0.00 | γ 0.00 |

Variable surface-separation

|  | W | T |
|---|---|---|
| $d_6$ | 9.47422 | 0.5 |
| $d_{11}$ | 3.21536 | 16.56449 |
| $d_{13}$ | 4.87491 | 0.5 |

Power of total system

|  |  |  |
|---|---|---|
| Px/Py | W | 1.0142 |
|  | T | 1.0061 |

-continued

| | |
|---|---|
| P2/P3 | 1.5781 |
| P1/PWx | −0.34472 |
| P1/PWy | −0.33808 |
| P1/PTx | −0.89458 |
| P1/PTy | −0.87712 |

EXAMPLE 3

| Surface No. | Radius of curvature | Surface separation | Displacement and tilt | Refractive index | Abbe's No. |
|---|---|---|---|---|---|
| Object plane | ∞ | | ∞ | | |
| 1 | ∞ (Hypothetic plane; Reference plane) | | | | |
| 2 | 84.94 (ASS ①) | | (1) | 1.5163 | 64.1' |
| 3 | FSS 1 (Reflective surface) | | (2) | 1.5163 | 64.1 |
| 4 | 84/94 (ASS ①) (Reflective surface) | | (1) | 1.5163 | 64.1 |
| 5 | FFS ② | | (3) | | |
| 6 | ∞(Stop) | $d_6$ | (4) | | |
| 7 | 18.40 | 1.74 | | 1.6604 | 53.4 |
| 8 | −36.73 | 0.10 | | | |
| 9 | 16.08 | 3.50 | | 1.5517 | 64.5 |
| 10 | −10.36 | 1.00 | | 1.7550 | 27.6 |
| 11 | −21.25 | $d_{11}$ | | | |
| 12 | 14.46 | 1.00 | | 1.7550 | 27.6 |
| 13 | 6.43 | $d_{13}$ | | | |
| 14 | ∞ (Hypothetic plane; Reference plane) | | | | |
| 14 | FFS ③ | | (5) | 1.5163 | 64.1 |
| 16 | 45.80 (ASS ②) (Reflective surface) | | (6) | 1.5163 | 64.1 |
| 17 | FFS ④ (Reflective surface) | | | | |
| 18 | 45.80 (ASS ②) | | (6) | | |
| Image plane | ∞ | | (8) | | |

ASS ①
K   0.0000
$A_4$  $8.5913 \times 10^{-6}$

ASS ②
K   0.0000
$A_4$  $-2.9042 \times 10^{-5}$

FFS ①
c   0.0000
$C_4$   $7.8561 \times 10^{-3}$   $C_6$   $8.7441 \times 10^{-3}$   $C_8$   $9.5149 \times 10^{-5}$
$C_{10}$  $3.8949 \times 10^{-4}$   $C_{11}$  $2.7282 \times 10^{-6}$   $C_{13}$  $3.7545 \times 10^{-5}$
$C_{15}$  $6.2120 \times 10^{-5}$ FFS ②
c   0.0000
$C_4$   $9.5005 \times 10^{-2}$   $C_6$   $1.2908 \times 10^{-1}$ FFS ③
c  0.0000
$C_4$   $5.9561 \times 10^{-2}$   $C_6$   $7.2748 \times 10^{-2}$   $C_8$   $8.9294 \times 10^{-4}$
$C_{10}$  $1.9313 \times 10^{-3}$ FFS ④
c   0.0000
$C_4$   $2.1658 \times 10^{-2}$   $C_6$   $2.3835 \times 10^{-2}$   $C_8$   $-2.3545 \times 10^{-4}$
$C_{10}$  $-3.4643 \times 10^{-4}$ Displacement and tilt(1)

X 0.00   Y −6.59   Z −0.40
α −1.12   β 0.00   γ 0.00

Displacement and tilt(2)

X 0.00   Y −0.14   Z 3.96
α 26.93   β 0.00   γ 0.00

Displacement and tilt(3)

X 0.00   Y −9.95   Z 1.68
α −56.75   β 0.00   γ 0.00

-continued

|  | Displacement and tilt(4) | |
|---|---|---|
| X 0.00 | Y −14.55 | Z 4.45 |
| α −58.76 | β 0.00 | γ 0.00 |
|  | Displacement and tilt(5) | |
| X 0.00 | Y 0.00 | Z 0.00 |
| α 6.50 | β 0.00 | γ 0.00 |
|  | Displacement and tilt(6) | |
| X 0.00 | Y 0.22 | Z 6.59 |
| α 49.20 | β 0.00 | γ 0.00 |
|  | Displacement and tilt(7) | |
| X 0.00 | Y −5.02 | Z 7.16 |
| α 76.49 | β 0.00 | γ 0.00 |
|  | Displacement and tilt(8) | |
| X 0.00 | Y −0.17 | Z 10.25 |
| α 58.76 | β 0.00 | γ 0.00 |
|  | Variable surface-separation | |
|  | W | T |
| $d_6$ | 10.86362 | 0.5 |
| $d_{11}$ | 0.1 | 10.93214 |
| $d_{13}$ | 2.23759 | 1.76903 |
|  | Power of total system | |
| Px/Py | W | 1.0471 |
|  | T | 1.1023 |
| P2/P3 |  | −1.5678 |
| P1x/PWx |  | −0.47235 |
| P1y/PWy |  | −0.48185 |
| P1x/PTx |  | −1.25098 |
| P1y/PTy |  | −1.34338 |
| P4x/PWx |  | 0.37943 |
| P4y/PWy |  | 0.40579 |
| P4x/PTx |  | 1.00488 |
| P4y/PTy |  | 1.13132 |

EXAMPLE 4

| Surface No. | Radius of curvature | Surface separation | Displacement and tilt | Refractive index | Abbe's No. |
|---|---|---|---|---|---|
| Object plane | ∞ | | | | |
| 1 | ∞ (Hypothetic plane;Reference plane) | | | | |
| 2 | 129.30 (ASS ①) | | (1) | 1.8830 | 40 |
| 3 | FFS ① (Reflective surface) | | (2) | 1.8830 | 40 |
| 4 | 129.30 (ASS ①) (Reflective surface) | | (1) | 1.8830 | 40 |
| 5 | 8.37 (ASS ②) | | (3) | | |
| 6 | ∞ (Hypothetic plane;Reference plane) | $d_6$ | (4) | | |
| 7 | 7.20(Stop) | 0.80 | | 1.8052 | 25.4 |
| 8 | 42.47 | 3.53 | | | |
| 9 | 14.78 | 1.20 | | 1.5471 | 64.8 |
| 10 | −3.91 | 0.80 | | 1.8052 | 25.4 |
| 11 | −11.47 | $d_{11}$ | | | |
| 12 | −125.61 | 0.80 | | 1.8052 | 25.4 |
| 13 | 6.79 | $d_{13}$ | | | |
| 14 | ∞ (Hypothetic plane;Reference plane) | | | | |
| 15 | FFS ② | | (5) | 1.8830 | 40.7 |
| 16 | 66.19 (ASS ③) (Reflective surface) | | (6) | 1.8830 | 40.7 |
| 17 | FFS ③ (Reflective surface) | | (7) | 1.8830 | 40.7 |
| 18 | 66.19 (ASS ③) | | (6) | | |
| Image | ∞ | | (8) | | |

-continued

| plane | | | | | | |
|---|---|---|---|---|---|---|
| | ASS ① | | | | | |
| K | 0.0000 | | | | | |
| $A_4$ | $9.2591 \times 10^{-6}$ | | | | | |
| $A_6$ | $-2.0407 \times 10^{-8}$ | | | | | |
| | ASS ② | | | | | |
| K | 0.0000 | | | | | |
| $A_4$ | $-1.5177 \times 10^{-4}$ | | | | | |
| $A_6$ | $-1.4773 \times 10^{-6}$ | | | | | |
| | ASS ③ | | | | | |
| K | 0.0000 | | | | | |
| $A_4$ | $-9.6320 \times 10^{-5}$ | | | | | |
| $A_6$ | $2.5878 \times 10^{-7}$ | | | | | |
| | FFS ① | | | | | |
| c | 0.0000 | | | | | |
| $C_4$ | $4.7644 \times 10^{-3}$ | $C_6$ | $7.9668 \times 10^{-3}$ | $C_8$ | $1.8620 \times 10^{-4}$ | |
| $C_{10}$ | $1.1773 \times 10^{-4}$ | $C_{11}$ | $-2.2031 \times 10^{-6}$ | $C_{13}$ | $-9.1492 \times 10^{-6}$ | |
| $C_{15}$ | $2.3697 \times 10^{-5}$ | | | | | |
| | FFS ② | | | | | |
| c | 0.0000 | | | | | |
| $C_4$ | $4.1973 \times 10^{-2}$ | $C_6$ | $5.7544 \times 10^{-2}$ | $C_8$ | $8.9294 \times 10^{-4}$ | |
| $C_{10}$ | $1.9313 \times 10^{-3}$ | $C_{11}$ | $-1.1740 \times 10^{-4}$ | $C_{13}$ | $-1.1289 \times 10^{-4}$ | |
| $C_{15}$ | $-2.7649 \times 10^{-4}$ | | | | | |
| | FFS ③ | | | | | |
| c | 0.0000 | | | | | |
| $C_4$ | $2.2725 \times 10^{-2}$ | $C_6$ | $1.7425 \times 10^{-2}$ | $C_8$ | $-1.2322 \times 10^{-5}$ | |
| $C_{10}$ | $-7.3554 \times 10^{-5}$ | $C_{11}$ | $-3.5691 \times 10^{-5}$ | $C_{13}$ | $-2.3891 \times 10^{-4}$ | |
| $C_{15}$ | $-8.2608 \times 10^{-5}$ | | | | | |

Displacement and tilt(1)

| X 0.00 | Y −5.08 | Z 0.00 |
|---|---|---|
| α 0.41 | β 0.00 | γ 0.00 |

Displacement and tilt(2)

| X 0.00 | Y −0.68 | Z 3.55 |
|---|---|---|
| α 25.17 | β 0.00 | γ 0.00 |

Displacement and tilt(3)

| X 0.00 | Y −7.36 | Z 2.54 |
|---|---|---|
| α −48.27 | β 0.00 | γ 0.00 |

Displacement and tilt(4)

| X 0.00 | Y −7.21 | Z 2.72 |
|---|---|---|
| α −50.53 | β 0.00 | γ 0.00 |

Displacement and tilt(5)

| X 0.00 | Y 0.00 | Z 0.00 |
|---|---|---|
| α −1.66 | β 0.00 | γ 0.00 |

Displacement and tilt(6)

| X 0.00 | Y 0.50 | Z 3.82 |
|---|---|---|
| α 37.11 | β 0.00 | γ 0.00 |

Displacement and tilt(7)

| X 0.00 | Y −4.03 | Z 2.97 |
|---|---|---|
| α 60.06 | β 0.00 | γ 0.00 |

Displacement and tilt(8)

| X 0.00 | Y 0.38 | Z 7.41 |
|---|---|---|
| α 50.53 | β 0.00 | γ 0.00 |

Variable surface-separation

| | W | T |
|---|---|---|
| $d_6$ | 14.15419 | 4.00739 |
| $d_{11}$ | 0.5 | 8.00395 |
| $d_{13}$ | 0.5 | 3.14286 |

Power of total system

| Px/Py | W | 1.0308 |
|---|---|---|
| | T | 1.0179 |
| P2/P3 | | −0.92945 |
| P1x/PWx | | −0.42951 |
| P1y/PWy | | −0.48066 |
| P1x/PTx | | −1.15137 |
| P1y/PTy | | −1.27237 |
| P4x/PWx | | 0.56794 |
| P4y/PWy | | 0.52497 |
| P4x/PTx | | 1.52246 |

EXAMPLE 5

| Surface No. | Radius of curvature | Surface separation | Displacement and tilt | Refractive index | Abbe'No. (Tilt angle) |
|---|---|---|---|---|---|
| Object plane | ∞ | ∞ | | | |
| 1 | FFS ① | 20.000 | | 1.5163 | 64.10 |
| 2 | FFS ② (Reflective surface) | −18.000 | θ | 1.5163 | 64.10 −22.50 |
| 3 | FFS ③ (Reflective surface) | 22.000 | θ | 1.5163 | 64.10 −22.50 |
| 4 | FFS ④ | $d_4$ | | | |
| 5 | −14.449 | 0.840 | | 1.5163 | 64.10 |
| 6 | 19.261 | $d_6$ | | | |
| 7 | ∞(Stop) | $d_7$ | | | |
| 8 | 19.501 | 3.653 | | 1.5163 | 64.10 |
| 9 | −15.219 | $d_9$ | | | |
| 10 | FFS ⑤ | 12.000 | | 1.5163 | 64.10 |
| 11 | FFS ⑥ (Reflective surface) | −10.000 | θ | 1.5163 | 64.10 22.50 |
| 12 | FFS ⑦ (Reflective surface) | 15.000 | θ | 1.5163 | 64.10 22.50 |
| 13 | FFS ⑧ | 1.000 | | | |
| 14 | ∞ | 1.200 | | 1.5477 | 62.90 |
| 15 | ∞ | 1.000 | | 1.5163 | 64.10 |
| 16 | ∞ | 1.000 | | | |
| 17 | ∞ | 1.000 | | 1.5163 | 64.10 |
| 18 | ∞ | 1.111 | | | |
| Image plane | ∞ | | | | |

FFS ①
$c$   0.0000
$C_4$   $-7.5009 \times 10^{-3}$   $C_6$   $-2.1698 \times 10^{-2}$   $C_8$   $7.8091 \times 10^{-5}$
$C_{11}$   $9.6725 \times 10^{-6}$   $C_{13}$   $8.1066 \times 10^{-6}$   $C_{15}$   $3.0824 \times 10^{-5}$ FFS ②
$c$   0.0000
$C_4$   $-4.5987 \times 10^{-4}$   $C_6$   $-1.9408 \times 10^{-3}$   $C_8$   $1.3215 \times 10^{-4}$
$C_{10}$   $3.3112 \times 10^{-6}$   $C_{11}$   $4.5966 \times 10^{-6}$   $C_{13}$   $2.0848 \times 10^{-6}$
$C_{15}$   $5.0426 \times 10^{-6}$ FFS ③
$c$   0.0000
$C_4$   $6.0726 \times 10^{-4}$   $C_6$   $8.7402 \times 10^{-4}$   $C_8$   $2.0211 \times 10^{-4}$
$C_{10}$   $-2.6217 \times 10^{-7}$   $C_{11}$   $-2.3841 \times 10^{-6}$   $C_{13}$   $-9.6467 \times 10^{-6}$
$C_{15}$   $-5.4325 \times 10^{-8}$ FFS ④
$c$   0.0000
$C_4$   $-2.3484 \times 10^{-2}$   $C_6$   $-2.1221 \times 10^{-2}$   $C_8$   $5.3902 \times 10^{-4}$
$C_{11}$   $-2.2316 \times 10^{-5}$   $C_{13}$   $-6.5861 \times 10^{-5}$   $c_{15}$   $-2.4822 \times 10^{-5}$ FFS ⑤
$c$   0.0000
$C_4$   $-4.8581 \times 10^{-2}$   $C_6$   $-5.3709 \times 10^{-2}$   $C_8$   $-1.2825 \times 10^{-3}$
$C_{11}$   $-2.3811 \times 10^{-4}$   $C_{13}$   $-4.7220 \times 10^{-4}$   $C_{15}$   $-8.0028 \times 10^{-5}$ FFS ⑥
$c$   0.0000
$C_4$   $-5.0296 \times 10^{-3}$   $C_6$   $-3.3812 \times 10^{-3}$   $C_8$   $-3.6898 \times 10^{-4}$
$C_{10}$   $-8.2047 \times 10^{-5}$   $C_{11}$   $-2.5859 \times 10^{-6}$   $C_{13}$   $4.3038 \times 10^{-6}$
$C_{15}$   $1.5714 \times 10^{-5}$ FFS ⑦
$c$   0.0000
$C_4$   $6.0440 \times 10^{-3}$   $C_6$   $8.5386 \times 10^{-3}$   $C_8$   $-2.4966 \times 10^{-4}$
$C_{10}$   $-1.3052 \times 10^{-5}$   $C_{11}$   $5.7932 \times 10^{-6}$   $C_{13}$   $9.7100 \times 10^{-6}$
$C_{15}$   $1.1470 \times 10^{-5}$ FFS ⑧
$c$   0.0000
$C_4$   $-6.4286 \times 10^{-2}$   $C_6$   $-7.1481 \times 10^{-3}$   $C_8$   $-7.8478 \times 10^{-4}$
$C_{11}$   $6.3197 \times 10^{-4}$   $C_{13}$   $4.4927 \times 10^{-4}$   $C_{15}$   $7.0314 \times 10^{-5}$ Variable surface-separation

| | W | S | T |
|---|---|---|---|
| $d_4$ | 0.50000 | 7.24647 | 7.24647 |
| $d_6$ | 7.24647 | 0.50000 | 0.50000 |
| $d_7$ | 10.03889 | 6.48301 | 0.61055 |
| $d_9$ | 2.44285 | 5.99874 | 11.87120 |

Power of total system

| Px/Py | W | 0.9812 |
|---|---|---|

-continued

|   |   |   |
|---|---|---|
|   | S | 0.9825 |
|   | T | 0.9807 |
| P2/P3 |   | −1.0828 |

EXAMPLE 6

| Surface No. | Radius of curvature | Surface separation | Displacement and tilt | Refractive index | Abbe's No. |
|---|---|---|---|---|---|
| Object plane | ∞ | ∞ |   |   |   |
| 1 | ∞ (Hypothetic plane;Reference plane) |   |   |   |   |
| 2 | FFS ① |   | (1) | 1.5163 | 64.10 |
| 3 | FFS ② (Reflective surface) |   | (2) | 1.5163 | 64.10 |
| 4 | FFS ① (Reflective surface) |   | (1) | 1.5163 | 64.10 |
| 5 | FFS ③ |   | (3) |   |   |
| 6 | ∞ (Hypothetic plane;Reference plane) | $d_6$ | (4) |   |   |
| 7 | −35.650 | 0.840 |   | 1.5163 | 64.10 |
| 8 | 23.402 | $d_8$ |   |   |   |
| 9 | ∞(Stop) | $d_9$ |   |   |   |
| 10 | 24.694 | 3.514 |   | 1.6500 | 46.09 |
| 11 | −7.393 | 1.000 |   | 1.7550 | 27.60 |
| 12 | −18.072 | $d_{12}$ |   |   |   |
| 13 | FFS 4 (Reference plane) |   |   | 1.5163 | 64.10 |
| 14 | FFS ⑤ (Reflective surface) |   | (5) | 1.5163 | 64.10 |
| 15 | FFS ⑥ (Reflective surface) |   | (6) | 1.5163 | 64.10 |
| 16 | FFS ⑤ |   | (5) |   |   |
| 17 | ∞ (Hypothetic plane;Reference plane) | 1.000 | (7) |   |   |
| 18 | ∞ | 1.200 |   | 1.5477 | 62.90 |
| 19 | ∞ | 1.000 |   | 1.5163 | 64.10 |
| 20 | ∞ | 1.000 |   |   |   |
| 21 | ∞ | 1.000 |   | 1.5163 | 64.10 |
| 22 | ∞ | 1.090 |   |   |   |
| Image plane | ∞ |   |   |   |   |

FFS ①
c  0.0000
$C_4$  $2.5288 \times 10^{-3}$   $C_6$  $-6.6068 \times 10^{-4}$   $C_8$  $4.6565 \times 10^{-5}$
$C_{13}$  $-1.1557 \times 10^{-6}$ FFS ②
c  0.0000
$C_4$  $2.7886 \times 10^{-3}$   $C_6$  $-4.5628 \times 10^{-4}$   $C_8$  $4.9730 \times 10^{-5}$
$C_{13}$  $-3.7261 \times 10^{-7}$ FFS ③
c  0.0000
$C_4$  $-1.0914 \times 10^{-2}$   $C_6$  $-1.3578 \times 10^{-2}$   $C_8$  $-3.3022 \times 10^{-5}$
$C_{13}$  $8.2452 \times 10^{-6}$ FFS ④
c  0.0000
$C_4$  $-9.5095 \times 10^{-3}$   $C_6$  $-2.0423 \times 10^{-2}$   $C_8$  $3.6379 \times 10^{-4}$
$C_{13}$  $-4.2870 \times 10^{-6}$ FFS ⑤
c  0.0000
$C_4$  $4.3588 \times 10^{-3}$   $C_6$  $1.7076 \times 10^{-3}$   $C_8$  $1.9537 \times 10^{-4}$
$C_{13}$  $1.8174 \times 10^{-6}$ FFS ⑥
c  0.0000
$C_4$  $1.4121 \times 10^{-2}$   $C_6$  $1.4332 \times 10^{-2}$   $C_8$  $1.4315 \times 10^{-4}$
$C_{13}$  $1.7817 \times 10^{-6}$ Displacement and tilt(1)

X 0.00   Y −15.315   Z 0.011
α −0.54   β 0.00   γ 0.00

Displacement and tilt(2)

X 0.00   Y 0.032   Z 8.573

-continued

|  |  |  |  |
|---|---|---|---|
| α 30.53 | β 0.00 | γ 0.00 |  |
|  | Displacement and tilt(3) |  |  |
| X 0.00 | Y −25.788 | Z 5.599 |  |
| α −56.65 | β 0.00 | γ 0.00 |  |
|  | Displacement and tilt(4) |  |  |
| X 0.00 | Y −26.692 | Z 6.027 |  |
| α −64.65 | β 0.00 | γ 0.00 |  |
|  | Displacement and tilt(5) |  |  |
| X 0.00 | Y 0.000 | Z 7.254 |  |
| α 48.17 | β 0.00 | γ 0.00 |  |
|  | Displacement and tilt(6) |  |  |
| X 0.00 | Y −8.607 | Z 8.211 |  |
| α 77.83 | β 0.00 | γ 0.00 |  |
|  | Displacement and tilt(7) |  |  |
| X 0.00 | Y −2.598 | Z 11.667 |  |
| α 64.65 | β 0.00 | γ 0.00 |  |

Variable surface-separation

|  | W | S | T |
|---|---|---|---|
| $d_6$ | 0.68973 | 15.27350 | 19.57887 |
| $d_8$ | 19.38914 | 4.80537 | 0.50000 |
| $d_9$ | 9.83667 | 5.48609 | 0.50000 |
| $d_{12}$ | 0.50000 | 4.85058 | 9.83667 |

Power of total system

| Px/Py | W | 0.989319 |
|---|---|---|
|  | S | 0.993703 |
|  | T | 0.996226 |
| P2/P3 |  | −0.7056 |

EXAMPLE 7

| Surface No. | Radius of curvature | Surface separation | Displacement and tilt | Refractive index | Abbe's No. |
|---|---|---|---|---|---|
| Object plane | ∞ | ∞ |  |  |  |
| 1 | ∞ (Hypothetic plane;Reference plane) |  |  |  |  |
| 2 | 383.817 (ASS ①) |  | (1) | 1.5163 | 64.10 |
| 3 | FFS ① (Reflective surface) |  | (2) | 1.5163 | 64.10 |
| 4 | 383.817 (ASS ①) (Reflective surface) |  | (1) | 1.5163 | 64.10 |
| 5 | FFS ② |  | (3) |  |  |
| 6 | ∞ (Hypothetic plane;Reference plane) | $d_6$ | (4) |  |  |
| 7 | 24.548 | 0.840 |  | 1.6658 | 52.71 |
| 8 | 3.921 | 5.605 |  |  |  |
| 9 | −4.217 | 1.000 |  | 1.5313 | 51.60 |
| 10 | −4.321 | $d_{10}$ |  |  |  |
| 11 | ∞(Stop) | $d_{11}$ |  |  |  |
| 12 | 45.901 | 2.035 |  | 1.6215 | 60.01 |
| 13 | −4.771 | 1.000 |  | 1.7550 | 27.60 |
| 14 | −7.439 | $d_{14}$ |  |  |  |
| 15 | FFS 3 (Reference plane) |  |  | 1.5163 | 64.10 |
| 16 | 29036.005 (ASS ②) (Reflective surface) |  | (5) | 1.5163 | 64.10 |
| 17 | FFS ④ (Reflective surface) |  | (6) | 1.5163 | 64.10 |
| 18 | 29036.005 (ASS ②) |  | (5) | 1.5163 | 64.10 |
| 19 | ∞ (Hypothetic plane;Reference plane) | 1.000 | (7) |  |  |
| 20 | ∞ | 1.200 |  | 1.5477 | 62.90 |
| 21 | ∞ | 1.000 |  | 1.5163 | 64.10 |
| 22 | ∞ | 1.000 |  |  |  |
| 23 | ∞ | 1.000 |  | 1.5163 | 64.10 |
| 24 | ∞ | 1.090 |  |  |  |

-continued

| | | | | | | |
|---|---|---|---|---|---|---|
| Image plane | $\infty$ | | | | | |
| | ASS ① | | | | | |
| K | 0.0000 | | | | | |
| $A_4$ | $-3.3833 \times 10^{-7}$ | | | | | |
| $A_6$ | $2.5259 \times 10^{-9}$ | | | | | |
| | ASS ② | | | | | |
| K | 0.0000 | | | | | |
| $A_4$ | $-2.0433 \times 10^{-5}$ | | | | | |
| $A_6$ | $2.6257 \times 10^{-7}$ | | | | | |
| | FFS ① | | | | | |
| c | 0.0000 | | | | | |
| $C_4$ | $1.0383 \times 10^{-3}$ | $C_6$ | $3.0650 \times 10^{-3}$ | $C_8$ | $1.1083 \times 10^{-5}$ | |
| $C_{10}$ | $2.2629 \times 10^{-5}$ | $C_{11}$ | $4.4372 \times 10^{-6}$ | $C_{13}$ | $1.0259 \times 10^{-5}$ | |
| $C_{15}$ | $4.8747 \times 10^{-6}$ | | | | | |
| | FFS ② | | | | | |
| c | 0.0000 | | | | | |
| $C_4$ | $-2.8752 \times 10^{-2}$ | $C_6$ | $-3.3213 \times 10^{-2}$ | $C_8$ | $6.7021 \times 10^{-5}$ | |
| $C_{11}$ | $3.6909 \times 10^{-5}$ | $C_{13}$ | $1.1907 \times 10^{-4}$ | $C_{15}$ | $5.8804 \times 10^{-5}$ | |
| | FFS ③ | | | | | |
| c | 0.0000 | | | | | |
| $C_4$ | $-1.0502 \times 10^{-2}$ | $C_6$ | $-2.2166 \times 10^{-3}$ | $C_8$ | $1.3813 \times 10^{-4}$ | |
| $C_{11}$ | $-6.7258 \times 10^{-4}$ | $C_{13}$ | $-1.5203 \times 10^{-3}$ | $C_{15}$ | $-7.8164 \times 10^{-4}$ | |
| | FFS ④ | | | | | |
| c | 0.0000 | | | | | |
| $C_4$ | $5.0336 \times 10^{-3}$ | $C_6$ | $2.4488 \times 10^{-4}$ | $C_8$ | $-5.5897 \times 10^{-5}$ | |
| $C_{10}$ | $-1.1110 \times 10^{-5}$ | $C_{11}$ | $8.7949 \times 10^{-5}$ | $C_{13}$ | $2.5924 \times 10^{-4}$ | |
| $C_{15}$ | $1.0682 \times 10^{-4}$ | | | | | |

Displacement and tilt(1)

| X 0.00 | Y $-9.361$ | Z $-0.484$ |
|---|---|---|
| $\alpha$ $-2.26$ | $\beta$ 0.00 | $\gamma$ 0.00 |

Displacement and tilt(2)

| X 0.00 | Y $-0.158$ | Z 7.253 |
|---|---|---|
| $\alpha$ 24.35 | $\beta$ 0.00 | $\gamma$ 0.00 |

Displacement and tilt(3)

| X 0.00 | Y $-18.488$ | Z 6.031 |
|---|---|---|
| $\alpha$ $-53.46$ | $\beta$ 0.00 | $\gamma$ 0.00 |

Displacement and tilt(4)

| X 0.00 | Y $-19.307$ | Z 6.605 |
|---|---|---|
| $\alpha$ $-55.00$ | $\beta$ 0.00 | $\gamma$ 0.00 |

Displacement and tilt(5)

| X 0.00 | Y 0.000 | Z 5.276 |
|---|---|---|
| $\alpha$ 45.25 | $\beta$ 0.00 | $\gamma$ 0.00 |

Displacement and tilt(6)

| X 0.00 | Y $-6.524$ | Z 5.333 |
|---|---|---|
| $\alpha$ 71.05 | $\beta$ 0.00 | $\gamma$ 0.00 |

Displacement and tilt(7)

| X 0.00 | Y $-2.087$ | 8.775 |
|---|---|---|
| $\alpha$ 55.00 | $\beta$ 0.00 | $\gamma$ 0.00 |

Variable surface-separation

| | W | S | T |
|---|---|---|---|
| $d_6$ | 1.65045 | 7.75545 | 9.89621 |
| $d_{10}$ | 8.34577 | 2.24076 | 0.10000 |
| $d_{11}$ | 4.80672 | 2.80119 | 0.50000 |
| $d_{14}$ | 0.50000 | 2.50553 | 4.80673 |

Power of total system

| | | |
|---|---|---|
| Px/Py | W | 0.983511 |
| | S | 0.989691 |
| | T | 0.987823 |
| P2/P3 | | $-1.34528$ |

Figure 8:
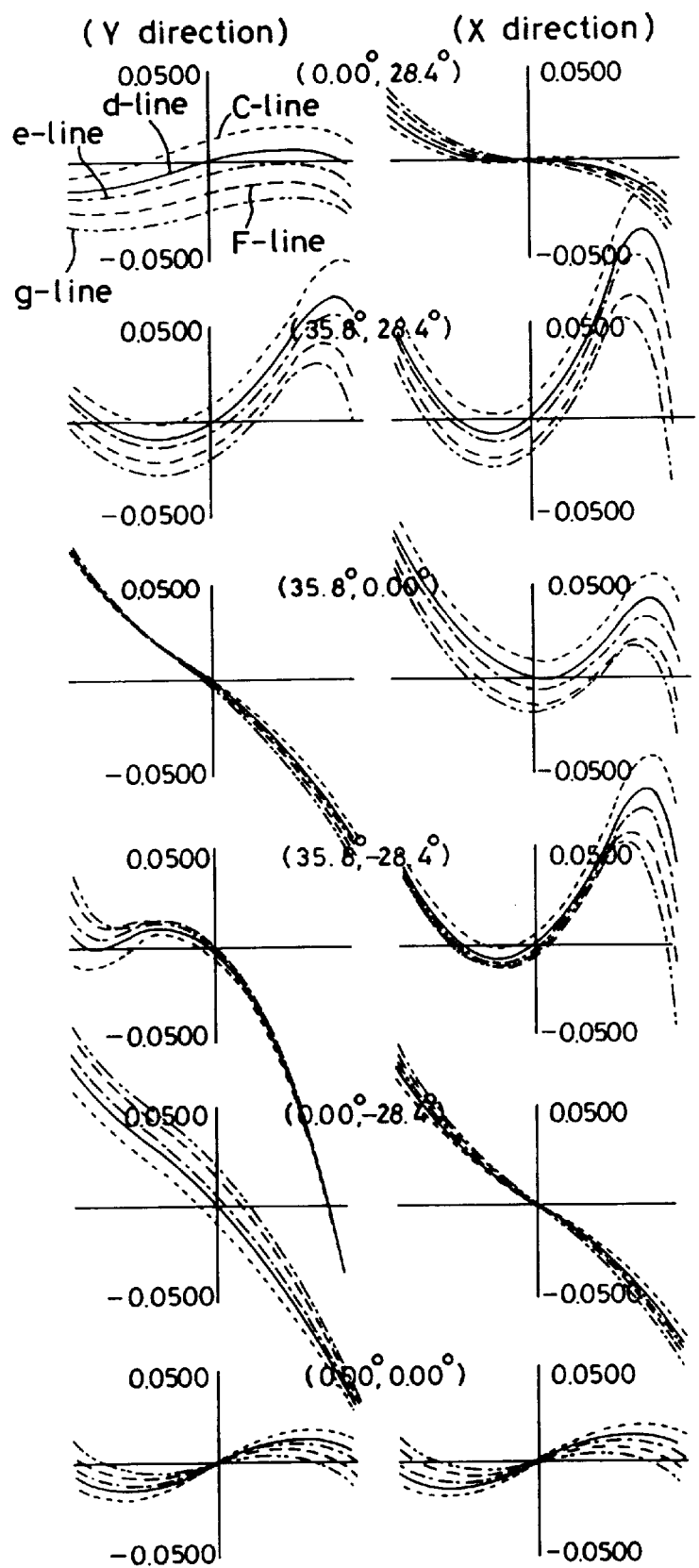
FIG. 8 is an aberrational diagram showing lateral aberrations at the wide-angle end in Example 1.
Figure 9:
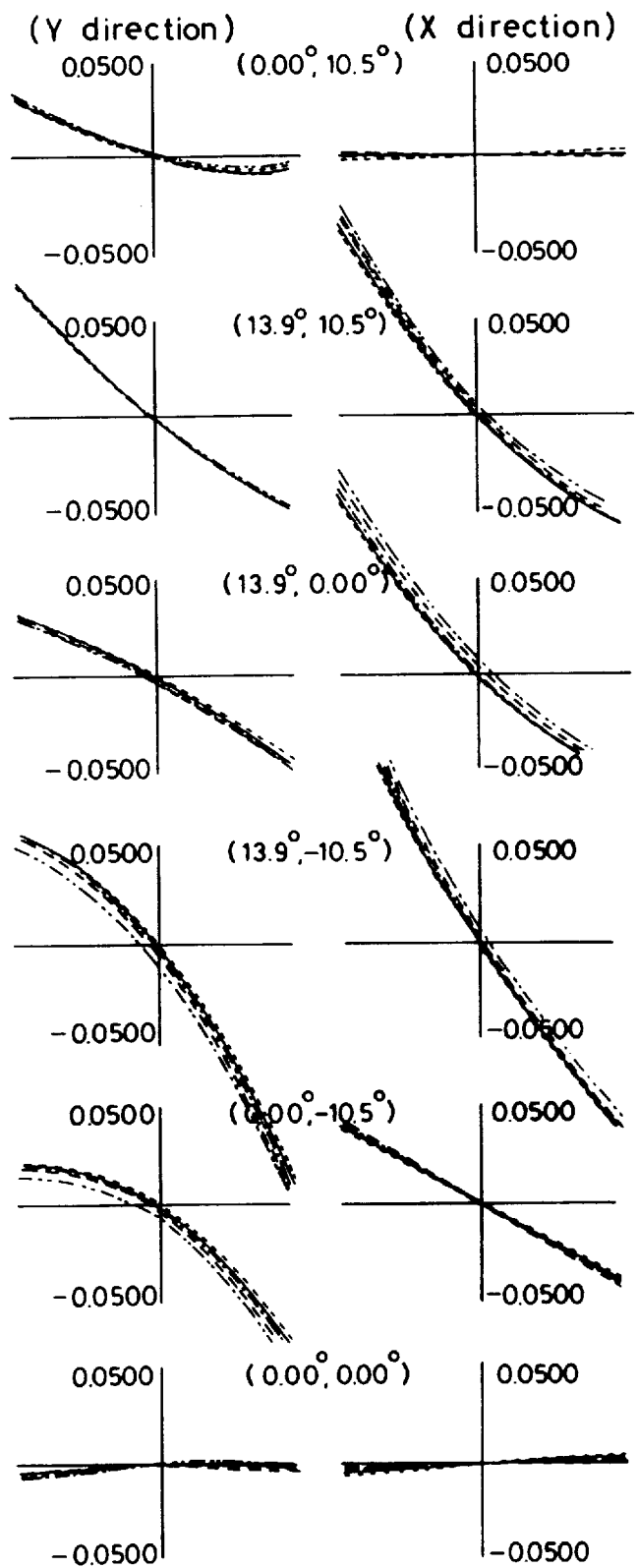
FIG. 9 is an aberrational diagram showing lateral aberrations at the telephoto end in Example 1.

Lateral aberrations in Example 1 at the wide-angle end and at the telephoto end are graphically shown in FIGS. 8 and 9, respectively. In these aberrational diagrams, the numerals in parentheses denote [horizontal (X-direction) field angle, vertical (Y-direction) field angle], and lateral aberrations at the field angles are shown.

The present invention is not necessarily limited to the foregoing examples but includes an image-forming optical system in which at least a decentered optical system having a rotationally asymmetric surface is disposed as a first lens unit on the object side thereof. FIGS. 10 to 13 show some examples of an image-forming optical system having, from the object side thereof, a first lens unit G1 formed from a decentered optical system, a negative second lens unit G2 formed from a refracting lens, a positive third lens unit G3 formed from a refracting lens, and a fourth lens unit G4 formed from a decentered optical system.

Figure 10:
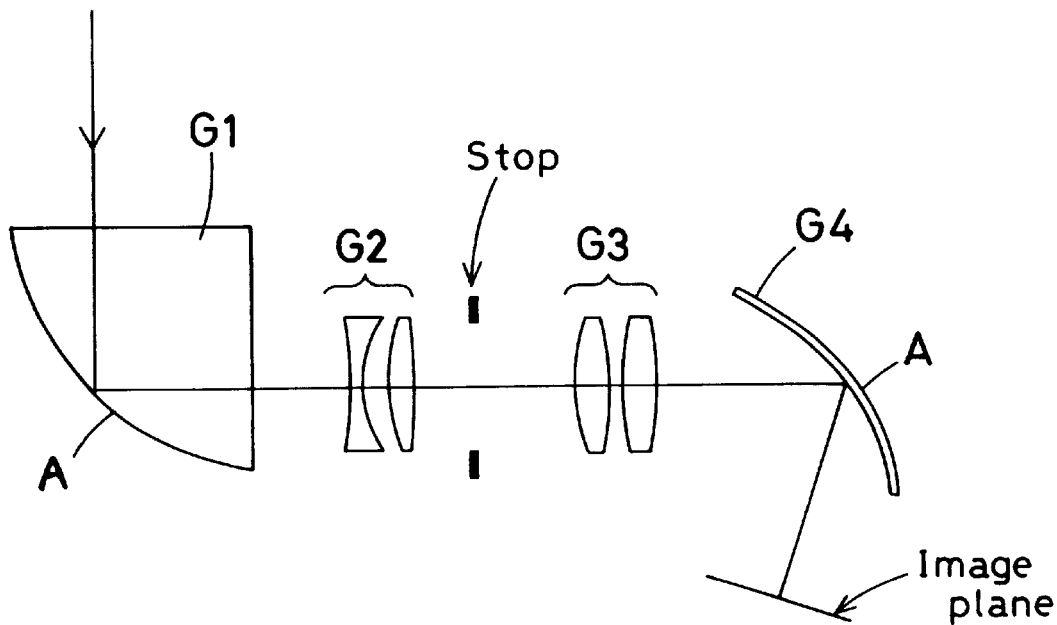
FIG. 10 is a diagram showing the arrangement of an example of an image-forming optical system having four lens units according to the present invention.

In the image-forming optical system shown in FIG. 10, the decentered optical system of the first lens unit G1 has a first transmitting surface through which light from an object enters the optical system; a first reflecting surface formed from a decentered rotationally asymmetric surface A which reflects the light entering through the first transmitting surface; and a second transmitting surface through which the light reflected by the first reflecting surface exits from the decentered optical system. The decentered optical system of the fourth lens unit G4 is formed from only a decentered reflecting surface which is a rotationally asymmetric surface A.

Figure 11:
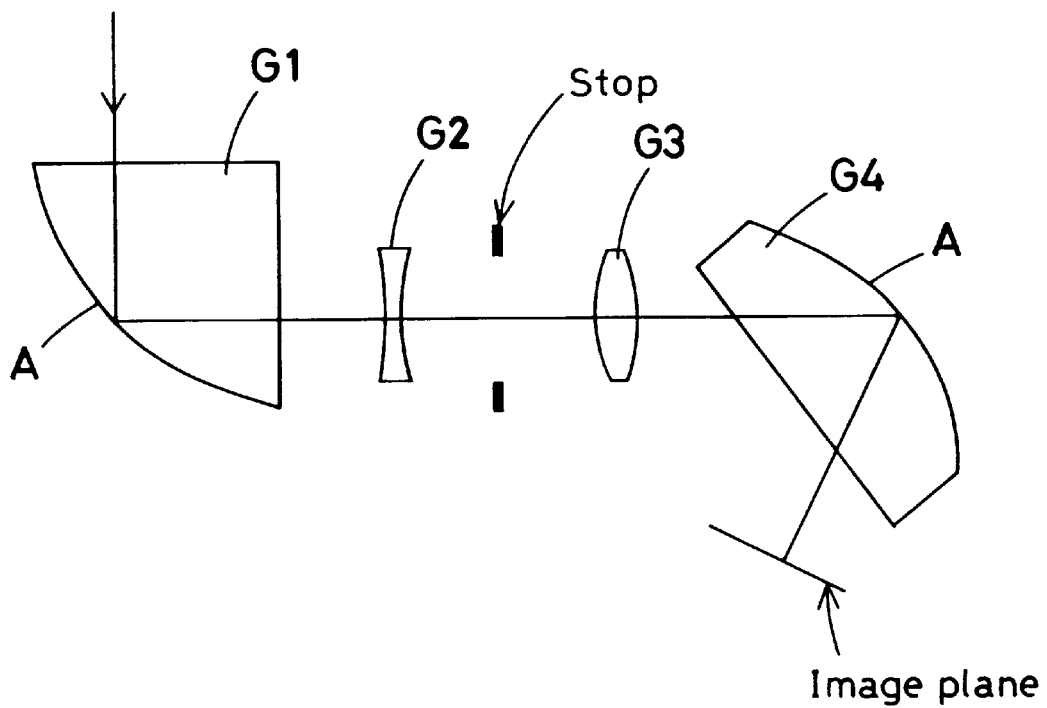
FIG. 11 is a diagram showing the arrangement of another example of an image-forming optical system having four lens units according to the present invention.

In the image-forming optical system shown in FIG. 11, the decentered optical system of the first lens unit G1 is similar to that in FIG. 10. The decentered optical system of the fourth lens unit G4 has a first transmitting surface through which light from the third lens unit G3 enters the optical system; a first reflecting surface formed from a decentered rotationally asymmetric surface A which reflects the light entering through the first transmitting surface; and the first transmitting surface through which the light reflected by the first reflecting surface exits from the decentered optical system.

Figure 12:
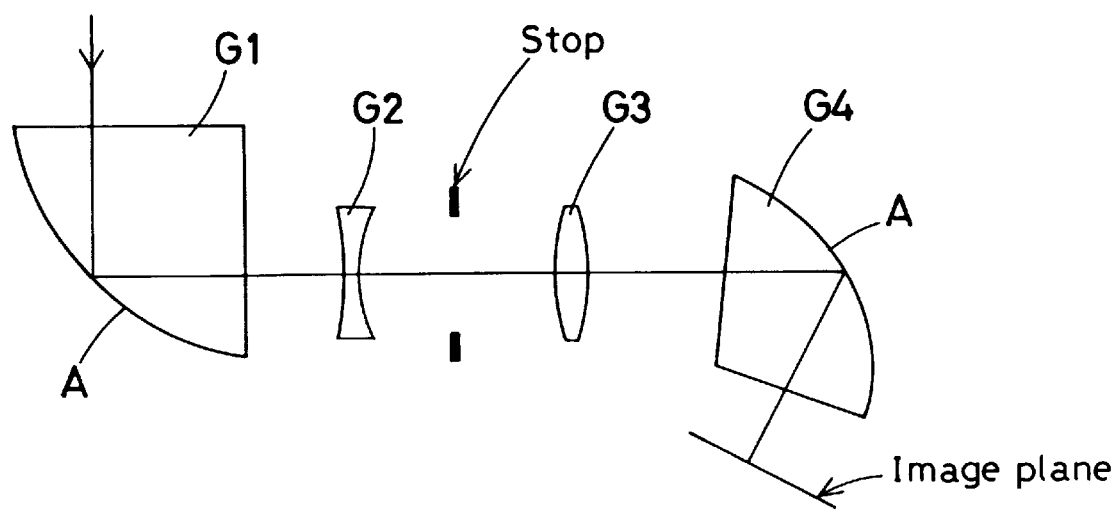
FIG. 12 is a diagram showing the arrangement of another example of an image-forming optical system having four lens units according to the present invention.

In the image-forming optical system shown in FIG. 12, the decentered optical system of the first lens unit G1 is similar to that in FIG. 10. The decentered optical system of the fourth lens unit G4 has a first transmitting surface through which light from the third lens unit G3 enters the optical system; a first reflecting surface formed from a decentered rotationally asymmetric surface A which reflects the light entering through the first transmitting surface; and a second transmitting surface through which the light reflected by the first reflecting surface exits from the decentered optical system.

Figure 13:
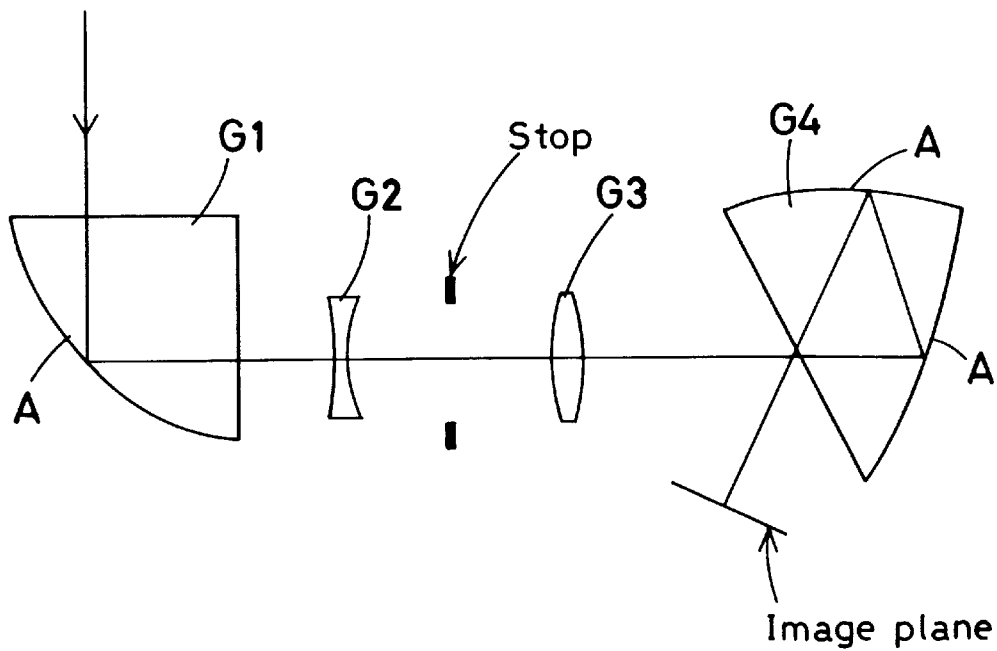
FIG. 13 is a diagram showing the arrangement of another example of an image-forming optical system having four lens units according to the present invention.

In the image-forming optical system shown in FIG. 13, the decentered optical system of the first lens unit G1 is similar to that in FIG. 10. The decentered optical system of the fourth lens unit G4 has a first transmitting surface through which light from the third lens unit G3 enters the optical system; a first reflecting surface formed from a decentered rotationally asymmetric surface A which reflects the light entering through the first transmitting surface; a second reflecting surface formed from a decentered rotationally asymmetric surface A which reflects the light reflected by the first reflecting surface; and the first transmitting surface through which the light reflected by the second reflecting surface exits from the decentered optical system.

Figure 14A:
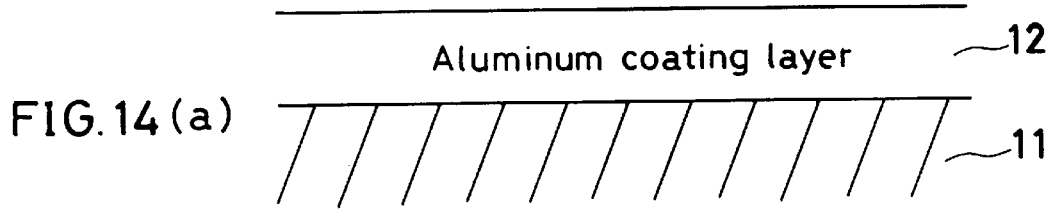
FIGS. 14A–14C are diagrams showing examples of arrangements of surfaces having reflecting action used in a decentered optical system according to the present invention.
Figure 14B:
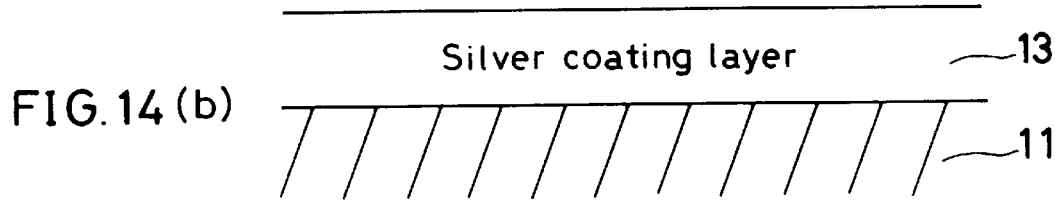
Figure 14C:
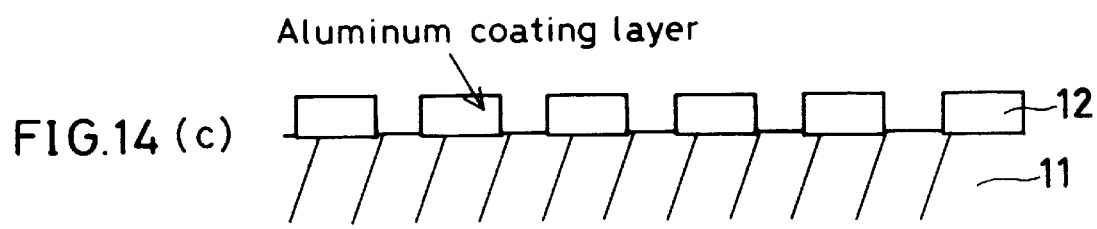

In a case where a rotationally asymmetric surface according to the present invention is used as a reflecting surface, particularly as a back-coated mirror, it is possible to use various forms of reflecting surfaces in addition to a totally reflecting surface that utilizes an angle of incidence greater than the critical angle. As shown in parts (a), (b) and (c) of FIG. 14, examples of reflecting surfaces usable in the present invention include a structure in which a transparent member 11 made of a transparent material such as a glass or plastic material has an aluminum coating layer 12 provided on the surface thereof [part (a) of FIG. 14]; a structure in which a transparent member 11 has a silver coating layer 13 provided on the surface thereof [part (b) of FIG. 14]; and a structure in which a transparent member 11 has an aluminum coating layer 12 partially provided on the surface thereof to form a semitransparent mirror [part (c) of FIG. 14]. It is also possible to use a reflecting surface structure which is provided with an optical multilayer film so as to have a reflectivity of 100% or to form a semitransparent mirror.

Figure 15:
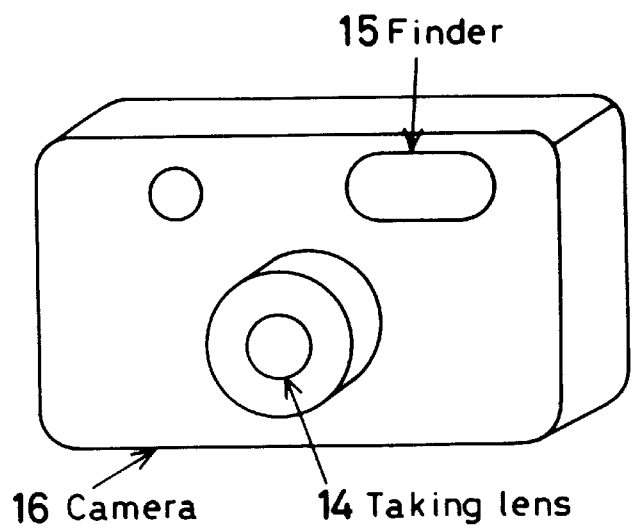
FIG. 15 is a perspective view schematically showing the arrangement of a camera to which an image-forming optical system according to the present invention is applied.

Further, as shown in FIG. 15, the image-forming optical system according to the present invention may be used as a taking lens 14 of a camera 16 comprising the taking lens 14, a finder 15, and a photographic film (not shown) or an image pickup device (not shown), e.g. CCD. The image-forming optical system according to the present invention may also be used as an objective lens or relay lens of the finder 15. Furthermore, the image-forming optical system according to the present invention may be used as an optical system of the finder 15 in which the first lens unit G1 to the third lens unit G3 form an objective lens, and the fourth lens unit G4 forms an ocular lens.

Figure 16:
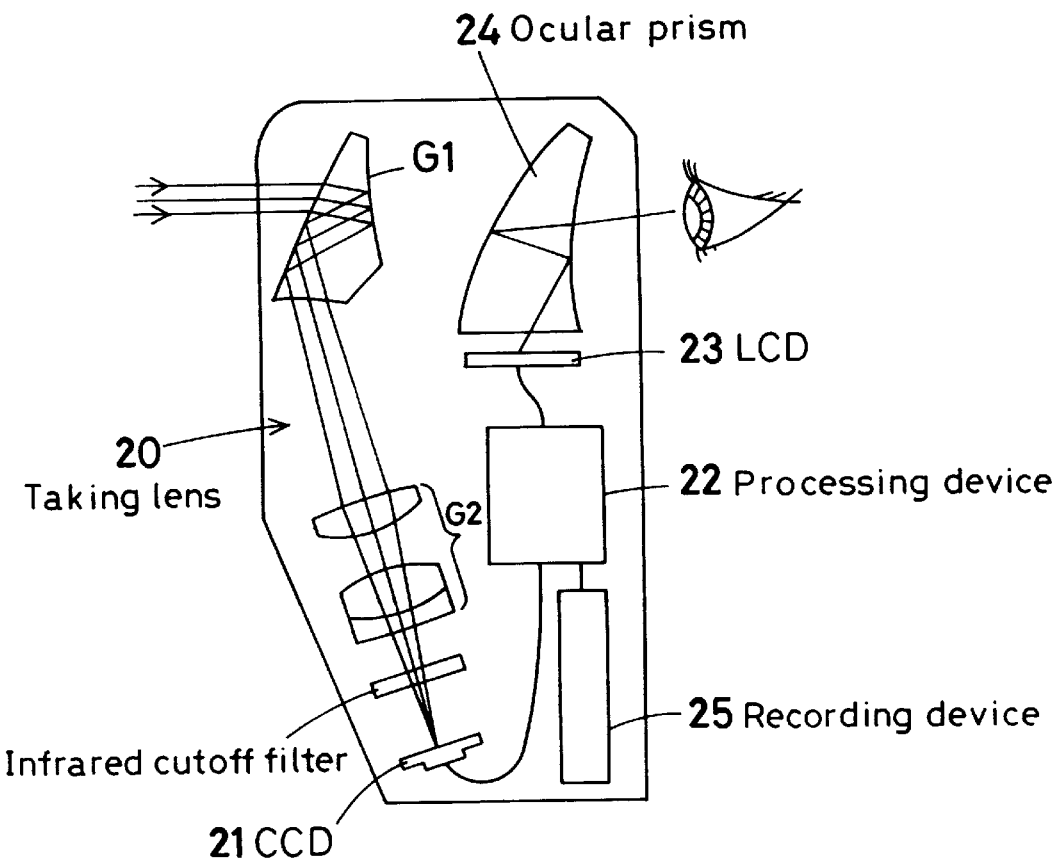
FIG. 16 is a diagram showing the arrangement of an example in which an image-forming optical system according to the present invention is used as a taking lens of an electronic camera.

FIG. 16 is a diagram showing the arrangement of an example in which the image-forming optical system according to Example 1 is used as a taking lens 20 of an electronic camera. A CCD 21 is placed in the image plane of the taking lens 20 to convert an image of a subject into an image signal. The image signal is inputted to an image signal processing device 22. The image signal from the processing device 22 is inputted to an LCD (Liquid Crystal Display) 23 to display the subject image on the LCD 23. An enlarged image of the displayed image is projected into a photographer's eye through an ocular prism 24 formed from a decentered optical system. Meanwhile, the image signal is recorded in a recording device 25 connected to the processing device 22.

Figure 17:
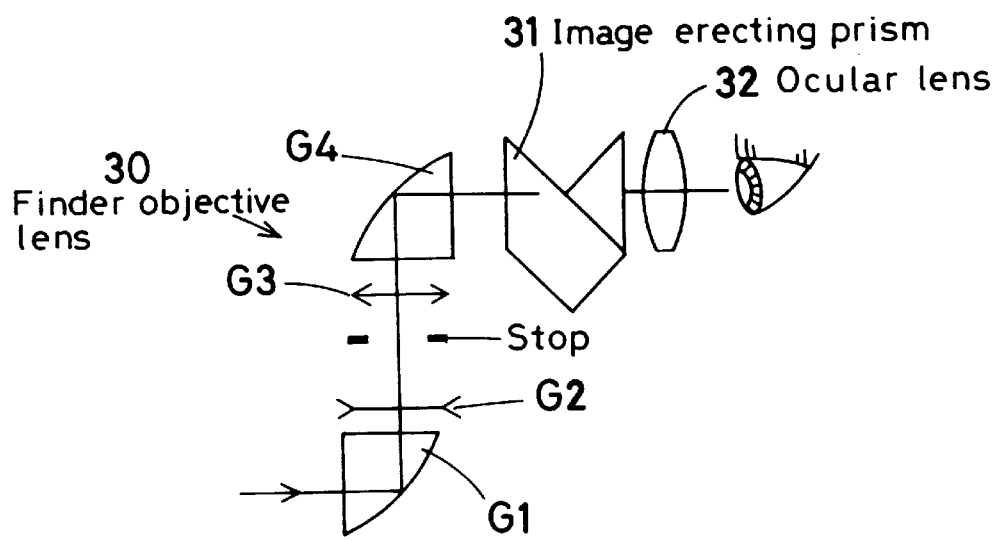
FIG. 17 is a diagram showing the arrangement of an example in which an image-forming optical system according to the present invention is used as an objective lens of a finder in a camera.
Figure 18:
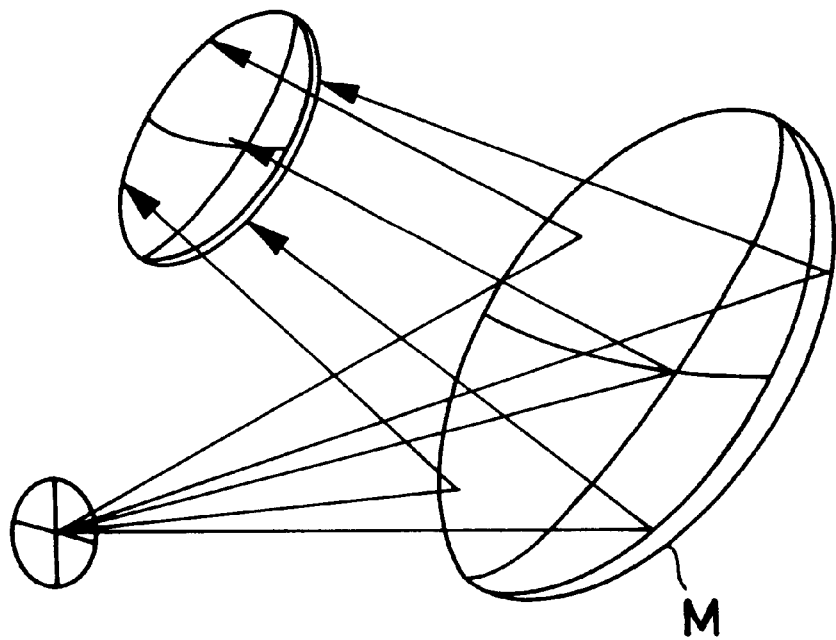
FIG. 18 is a diagram showing curvature of field produced by a decentered concave mirror.
Figure 19:
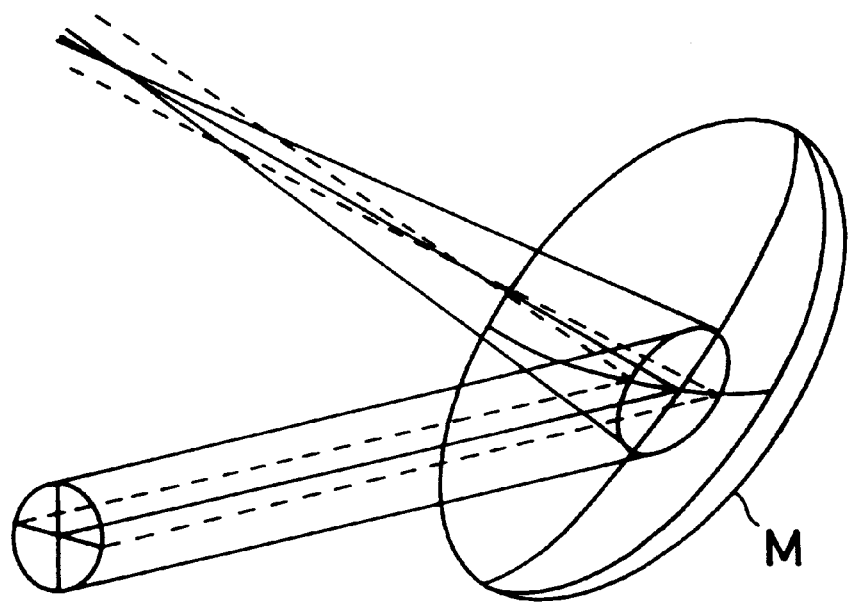
FIG. 19 is a diagram showing axial astigmatism produced by a decentered concave mirror.
Figure 20:
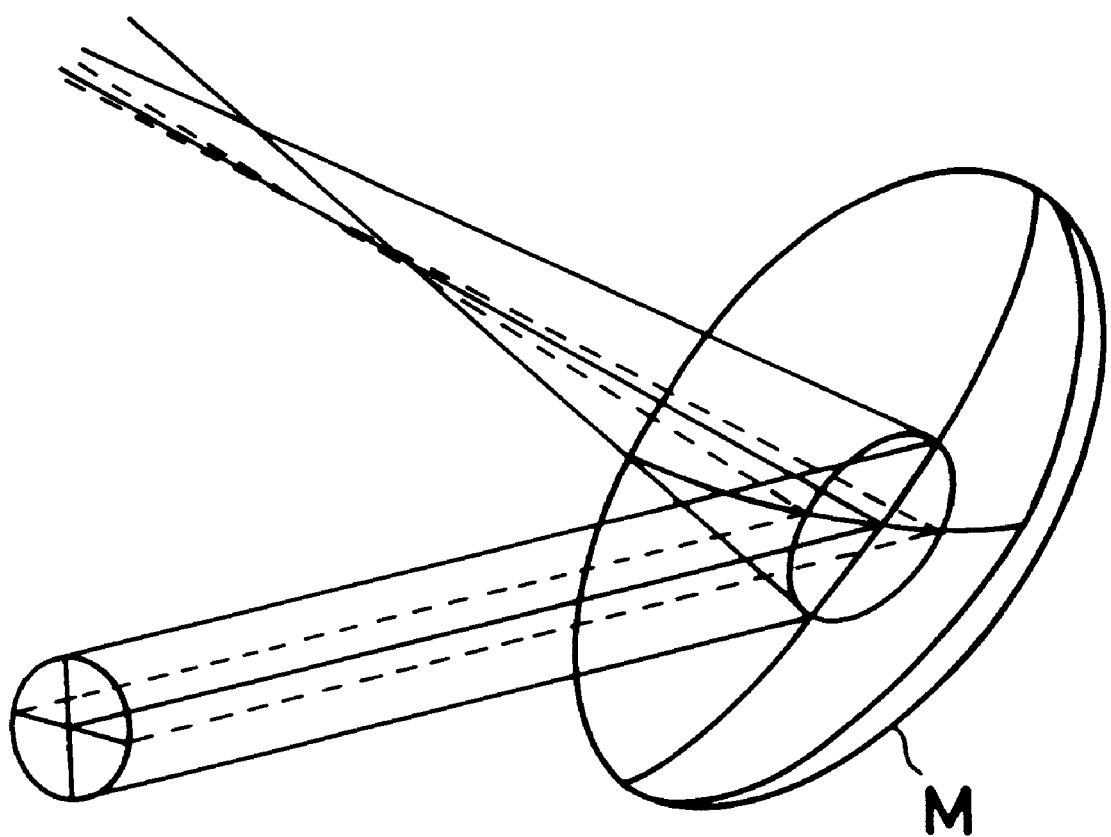
FIG. 20 is a diagram showing axial coma produced by a decentered concave mirror.
Figure 21:
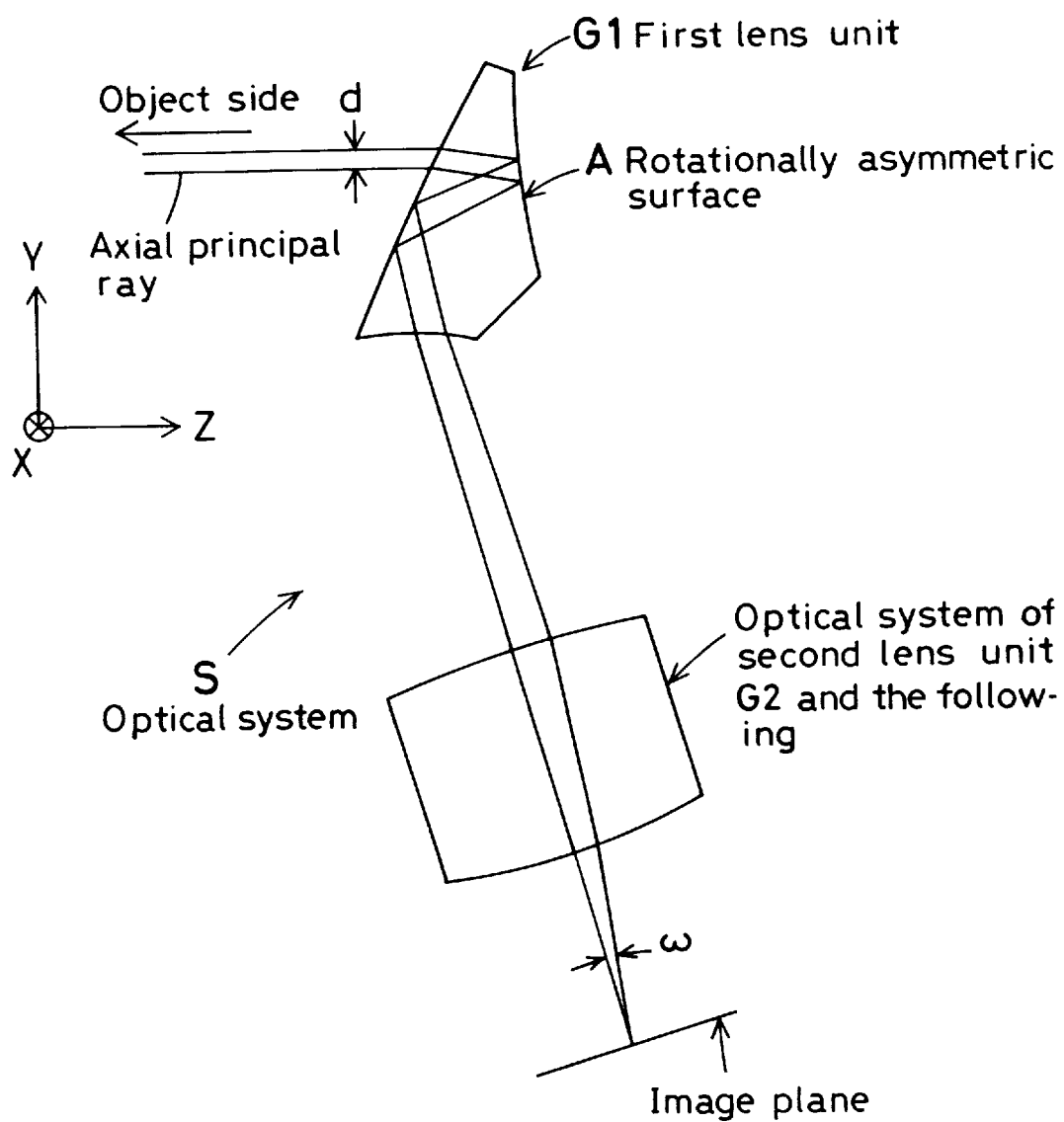
FIG. 21 is a diagram for explaining power in an optical system according to the present invention.

FIG. 17 is a diagram showing the arrangement in which an image-forming optical system having four lens units G1 to G4 according to the present invention is used as an objective lens 30 of the finder 15 in the camera 16 as shown in FIG. 15. An inverted intermediate image formed by the objective lens 30 is erected by an image erecting prism 31, and an enlarged erect image is observed through an ocular lens 32.

As will be clear from the foregoing description, it is possible according to the present invention to provide an image-forming optical system, e.g. a variable-magnification optical system, which is compact and has minimal aberrations due to decentration in comparison to rotationally symmetric transmission optical systems.

What is claimed is:

1. An image-forming optical system comprising:
 a first lens unit disposed on an object side of said image-forming optical system which is closer to an object, said first lens unit being formed from a decentered optical system; and
 a second lens unit disposed on an image side of said first lens unit, said second lens unit having at least one lens,
 wherein said decentered optical system has at least one rotationally asymmetric surface having no axis of rotational symmetry intercepting nor non-intercepting said at least one rotationally asymmetric surface to correct rotationally asymmetric aberrations caused by decentration,
 wherein, a light ray emanating from a center of an object point and passing through a center of a pupil to reach a center of an image is defined as an axial principal ray, and a Y-axis is taken in a plane of decentration of each decentered surface, and an X-axis is taken in a direction perpendicularly intersecting the Y-axis, and further an axis constituting an orthogonal coordinate system in combination with the X- and Y-axes is defined as a Z-axis, and further said axial principal ray and a light ray which is parallel to said axial principal ray and a light ray which is parallel to said axial principal ray at a slight distance d in an X-axis direction are made to enter said image-forming optical system from an entrance side thereof, and a tangent of an angle formed between the two rays is projected on an XZ-plane at an exit side of said optical system is divided by the distance d to determine a value Px, and further said axial principal ray and a light ray which is parallel to said axial principal ray at the slight distance d in a Y-axis direction are made to enter said image-forming optical system from the entrance side thereof, and a tangent of an angle formed between the two rays as projected on a YZ-plane at the exit side of said optical system is divided by the distance d to determine a value Py, the following condition is satisfied:

$$0.1 < Px/Py < 10 \qquad (1\text{-}1).$$

2. An image-forming optical system comprising:

a first lens unit disposed on an object side of said image-forming optical system which is closer to an object, said first lens unit being formed from a decentered optical system; and a second lens unit disposed on an image side of said first lens unit, said second lens unit having at least one lens, wherein said decentered optical system has at least one rotationally asymmetric surface having no axis of rotational symmetry intercepting nor non-intercepting said at least one rotationally asymmetric surface to correct rotationally asymmetric aberrations caused by decentration, and said image-forming optical system satisfies the following condition:

$$-100 < P1/P < -0.01 \qquad (3\text{-}1)$$

where P1 is a power in an arbitrary direction of said first lens unit, and P is a power in an arbitrary direction of said image-forming optical system.

3. An image-forming optical system, comprising:

a first lens unit disposed on an object side of said image-forming optical system which is closer to an object, said first lens unit being formed from a decentered optical system;

a second lens unit disposed on an image side of said first lens unit, said second lens unit having at least one lens, and an aperture stop disposed between said first lens unit and said second lens unit, wherein said decentered optical system has at least one rotationally asymmetric surface having no axis of rotational symmetry intercepting nor non-intercepting said at least one rotationally asymmetric surface to correct rotationally asymmetric aberrations caused by decentration.

4. An image-forming optical system, comprising:

a first lens unit disposed on an object side of said image-forming optical system which is closer to an object, said first lens unit being formed from a decentered optical system;

a second lens unit disposed on an image side of said first lens unit, said second lens unit having at least one lens; and a third lens unit disposed on an image side of said second lens unit, said third lens unit having at least one lens, wherein said decentered optical system has at least one rotationally asymmetric surface having no axis of rotational symmetry intercepting nor non-intercepting said at least one rotationally asymmetric surface to correct rotationally asymmetric aberrations caused by decentration.

5. An image-forming optical system according to claim 3 or 4, wherein zooming from a wide-angle end to a telephoto end is performed by changing a spacing between said first lens unit and said second lens unit.

6. An image-forming optical system according to claim 5, wherein when zooming from the wide-angle end to the telephoto end is performed, at least said second lens unit is moved to change the spacing.

7. An image-forming optical system according to claim 6, wherein when zooming from the wide-angle end to the telephoto end is performed, said second lens unit is moved toward said first lens unit.

8. An image-forming optical system according to claim 3 or 4, wherein at least one of said decentered optical systems comprises only a first reflecting surface, wherein light rays are reflected by said first reflecting surface in a direction different from a direction in which the light rays are incident thereon when entering said decentered optical system.

9. An image-forming optical system according to claim 3 or 4, wherein at least one of said decentered optical systems comprises a first reflecting surface and a first transmitting surface, wherein light rays enter said decentered optical system through said first transmitting surface and are reflected by said first reflecting surface to exit from said decentered optical system through said first transmitting surface in a direction different from a direction in which the light rays are incident on said first transmitting surface when entering said decentered optical system.

10. An image-forming optical system claim 3 or 4, wherein at least one of said decentered optical systems comprises a first reflecting surface, a first transmitting surface, and a second transmitting surface, wherein light rays enter said decentered optical system through said first transmitting surface and are reflected by said first reflecting surface to exit from said decentered optical system through said second transmitting surface in a direction different from a direction in which the light rays are incident on said first transmitting surface when entering said decentered optical system.

11. An image-forming optical system according to claim 3 or 4, wherein at least one of said decentered optical systems comprises a first reflecting surface, a second reflecting surface, and a first transmitting surface, wherein light rays enter said decentered optical system through said first transmitting surface and are reflected by said first reflecting surface and then reflected by said second reflecting surface to exit from said decentered optical system through said first transmitting surface.

12. An image-forming optical system according to claim 3 or 4, wherein at least one of said decentered optical systems comprises a first reflecting surface, a second reflecting surface, a first transmitting surface, and a second transmitting surface, wherein light rays enter said decentered optical system through said first transmitting surface and are reflected by said first reflecting surface and then reflected by said second reflecting surface to exit from said decentered optical system through said second transmitting surface.

13. An image-forming optical system according to claim 12, wherein said first and second reflecting surfaces are disposed such that principal rays aNd reflected rays thereof substantially intersect each other in said at least one decentered optical system.

14. An image-forming optical system according to claim 12, wherein said first and second reflecting surfaces are disposed such that principal rays and reflected rays thereof do not substantially intersect each other in said at least one decentered optical system.

15. An image-forming optical system according to claim 14, wherein said first transmitting surface and second reflecting surface of said at least one decentered optical system are an identical surface.

16. An image-forming optical system according to claim 14, wherein said first reflecting surface and second transmitting surface of said at least one decentered optical system are an identical surface.

17. An image-forming optical system according to claim 3 or 4, wherein at least one of said decentered optical systems comprises a first reflecting surface, a second reflecting surface, a third reflecting surface, a first transmitting surface, and a second transmitting surface, wherein light rays enter said decentered optical system through said first transmitting surface and are reflected successively by said first reflecting surface, said second reflecting surface and said third reflecting surface to exit from said decentered optical system through said second transmitting surface in a direction different from a direction in which the light rays are incident on said first transmitting surface when entering said decentered optical system.

18. An image-forming optical system according to claim 17, wherein said first transmitting surface and second reflecting surface of said at least one decentered optical system are an identical surface.

19. An image-forming optical system according to claim 17, wherein said first reflecting surface and third reflecting surface of said at least one decentered optical system are an identical surface.

20. An image-forming optical system according to claim 17, wherein said second transmitting surface and second reflecting surface of said at least one decentered optical system are an identical surface.

21. A camera apparatus comprising:

an image-forming optical system according to claim 3 or 4; and a light-receiving device which receives an object image formed by said image-forming optical system.

22. A camera apparatus comprising an image-forming optical system according to claim 3 or 4, said image-forming optical system being provided in a finder of a camera.

23. An image-forming optical system according to claim 4, wherein said third lens unit has a positive power as a whole.

24. An image-forming optical system according to claim 4, wherein zooming from a wide-angle end to a telephoto end is performed by changing both a spacing between said first lens unit and said second lens unit and a spacing between said second lens unit and said third lens unit.

25. An image-forming optical system according to claim 4, further comprising:

a fourth lens unit disposed on an image side of said third lens unit.

26. An image-forming optical system according to claim 25, wherein when zooming from a wide-angle end to a telephoto end is performed, said third lens unit is moved toward said fourth lens unit.

27. An image-forming optical system according to claim 25, which satisfies the following condition:

$$0.01 < P2/P3 < 100 \qquad (2\text{-}1)$$

where P2 is a power of said second lens unit, and P3 is a power of said third lens unit.

28. An image-forming optical system according to claim 25, which satisfies the following condition:

$$0.01 < P4/P < 100 \qquad (4\text{-}1)$$

where P4 is a power in an arbitrary direction of said fourth lens unit, and P is a power in an arbitrary direction of said image-forming optical system.

* * * * *